(12) United States Patent
Kure

(10) Patent No.: US 8,675,728 B2
(45) Date of Patent: Mar. 18, 2014

(54) TRANSMITTING APPARATUS AND METHOD, AND RECEIVING APPARATUS AND METHOD

(75) Inventor: Yoshinobu Kure, Kanagawa (JP)

(73) Assignee: Sony Corporation, Tokyo (JP)

(*) Notice: Subject to any disclaimer, the term of this patent is extended or adjusted under 35 U.S.C. 154(b) by 516 days.

(21) Appl. No.: 12/964,184

(22) Filed: Dec. 9, 2010

(65) Prior Publication Data

US 2011/0142140 A1 Jun. 16, 2011

(30) Foreign Application Priority Data

Dec. 16, 2009 (JP) ................................ P2009-285039

(51) Int. Cl.
*H04B 1/66* (2006.01)
*H04B 14/06* (2006.01)

(52) U.S. Cl.
USPC .......................................... 375/240; 375/250

(58) Field of Classification Search
USPC ............................ 275/240, 250; 375/240, 250
See application file for complete search history.

(56) References Cited

U.S. PATENT DOCUMENTS

| 5,566,208 | A | * | 10/1996 | Balakrishnan | ................ | 375/240 |
| 5,892,548 | A | * | 4/1999 | Kim | ......................... | 375/240.04 |
| 2006/0109856 | A1 | * | 5/2006 | Deshpande | ................... | 370/412 |
| 2008/0162862 | A1 | * | 7/2008 | Matsumoto et al. | .......... | 711/171 |

FOREIGN PATENT DOCUMENTS

WO WO 2004/008673 A2 1/2004

OTHER PUBLICATIONS

Jordi Ribas-Corbera et al., "A Generalized Hypothetical Reference Decoder for H.264/AVC," IEEE Transactions on Circuits and Systems for Video Technology, vol. 13, No. 7, Jul. 2003, 14 pages.
The Extended European Search Report issued May 19, 2011, in Application No. / Patent No. 10194411.4-2413.
Sachin Deshpande, et al. "Buffering Control Methods and Straming Protocol Extensions for Adaptive Media Streaming", Consumer Communications and Networking Conference 4th IEEE, XP031087798, Jan. 1, 2007, pp. 308-312.
"3rd Generation Partnership Project; Technical Specification Group Services and System Aspects; Transparent end-to-end packet switched streaming service (PSS); RTP usage model (Release 8)", 3GPP TR 26.937 V8.0.0, (Technical Report), 3RD Generation Partnership Project (3GPP), Mobile Competence Centre, XP050370431, Dec. 1, 2008, pp. 1-44.
Guanfeng Liang, et al., "Effect of Delay and Buffering on Jitter-Free Straming Over Random VBR Channels" IEEE Transactions on Multimedia, XP011235640, pp. 1128-1141.

* cited by examiner

*Primary Examiner* — Dave Czekaj
*Assistant Examiner* — Nam Pham
(74) *Attorney, Agent, or Firm* — Sony Corporation

(57) ABSTRACT

Image data is encoded to generate encoded data. An encoding-time buffer period that is a minimum buffer period necessary to prevent synchronous reproduction in which the encoded data is decoded and reproduced in synchronization with a timestamp added to the encoded data from failing due to a delay caused by encoding of the image data is added to the encoded data as encoding header information. A transmission-time buffer period that is a minimum buffer period necessary to prevent the synchronous reproduction from failing due to a delay caused by encoding of the image data and transmission of the encoded data is added to the encoded data as transmission header information different from the encoding header information. The encoded data having the encoding-time buffer period and the transmission-time buffer period added thereto is transmitted to another apparatus that performs the synchronous reproduction via a network.

18 Claims, 25 Drawing Sheets

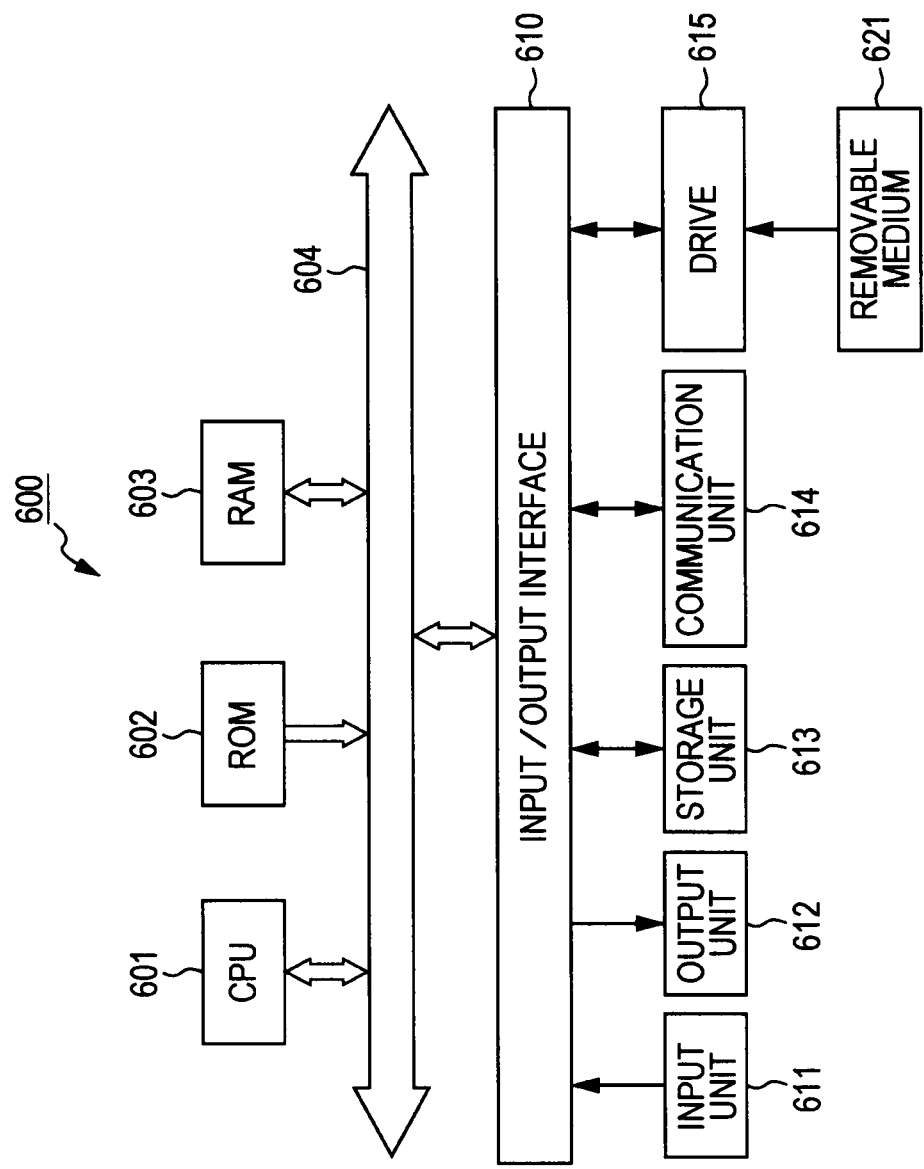

TRANSMITTING APPARATUS AND METHOD, AND RECEIVING APPARATUS AND METHOD

BACKGROUND OF THE INVENTION

1. Field of the Invention

The present invention relates to a transmitting apparatus and method, and a receiving apparatus and method. More specifically, the present invention relates to a transmitting apparatus and method, and a receiving apparatus and method that provide low-delay data transmission with reduced unnecessary delay periods in a more stable manner irrespective of the network status.

2. Description of the Related Art

In recent years, the demand for low-delay transmission of multimedia data via the Internet or any other transmission path has increased. For example, applications for allowing an operator in a remote place to operate surgical instrument in the operating room while viewing the operating room scenes of a moving image transmitted from the operating room, called telesurgery applications, are available. In such applications, it is desirable that a moving image be transmitted with a delay less than a several frame interval in order to increase the operability of surgical instrument at a remote place.

In existing streaming methods, a transmitting apparatus notifies a receiving terminal of a buffering period or a parameter value necessary for calculating a buffering period by, for example, writing it in a transmission format or a signaling message, and the receiving terminal sets a buffering period in accordance with the obtained information.

Further, the virtual reference decoder of a type that characterizes the encoding rate and the buffer parameter using the so-called leaky bucket model and defines them as a set of parameters (R, B, F) has been proposed (see, for example, Jordi Ribas-Corbera, Member, IEEE, Philip A. Chou, Senior Member, IEEE, and Shankar L. Regunathan, "A Generalized Hypothetical Reference Decoder for H.264/AVC" IEEE TRANSACTIONS ON CIRCUITS AND SYSTEMS FOR VIDEO TECHNOLOGY, VOL. 13, No. 7, JULY 2003), where R denotes the transmission rate, B denotes the buffer size, and F denotes the initial decoder buffer fullness (F/R is the start-up or initial buffer delay).

The initial buffer delay F/R is equivalent to the buffering period. When the transmitting apparatus smoothes the data rate to a transmission rate different from the encoding rate and transmits the resulting data by writing a plurality of sets of parameters (R, B, F), the receiving apparatus can decode and reproduce the data in a stable manner without causing buffer failure by specifying the buffer size corresponding to the transmission rate.

SUMMARY OF THE INVENTION

In the above method, there is no problem when the status of a network serving as a transmission path is stable. However, if the network environment is unstable and per-packet transmission delay variations occur due to the change in transmission rate, network jitter, packet loss, or the like, buffering and decoding reproduction in accordance with a buffering period written in the transmission format at the time of encoding may cause buffer failure due to the lack of necessary data at the reproduction time.

It is therefore desirable to provide synchronous reproduction by transmitting stream data of video or the like, in which a buffering period is divided into an encoding-time buffer period and a transmission-time buffer period which are separately written in the transmission format and then transmission is performed so as to ensure synchronous reproduction with a minimum buffer period (delay) that takes the network status into account while maintaining the independency of a CODEC unit and a transmission unit.

According to an embodiment of the present invention, a transmitting apparatus includes encoding means for encoding image data to generate encoded data; encoding-time buffer period adding means for adding an encoding-time buffer period to the encoded data as encoding header information, the encoding-time buffer period being a minimum buffer period necessary to prevent synchronous reproduction in which the encoded data is decoded and reproduced in synchronization with a timestamp added to the encoded data from failing due to a delay caused by encoding of the image data by the encoding means; transmission-time buffer period adding means for adding a transmission-time buffer period to the encoded data as transmission header information different from the encoding header information, the transmission-time buffer period being a minimum buffer period necessary to prevent the synchronous reproduction from failing due to a delay caused by encoding of the image data and transmission of the encoded data; and transmitting means for transmitting, via a network to another apparatus that performs the synchronous reproduction, the encoded data in which the encoding header information including the encoding-time buffer period has been added by the encoding-time buffer period adding means and in which the transmission header information including the transmission-time buffer period has been added by the transmission-time buffer period adding means.

The transmitting apparatus may further include network status information collecting means for collecting network status information that is status information regarding communication via the network, the network status information including at least a transmission rate, a network jitter, a packet loss rate, and a transmission delay; network-responsive buffer period calculating means for calculating a network-responsive buffer period using the network status information collected by the network status information collecting means, the network-responsive buffer period being a minimum buffer period necessary to prevent the synchronous reproduction from failing due to a delay caused by transmission of the encoded data; and transmission-time buffer period calculating means for calculating the transmission-time buffer period using the network-responsive buffer period calculated by the network-responsive buffer period calculating means and the encoding-time buffer period.

The transmission-time buffer period calculating means may set, as the transmission-time buffer period, a sum of the encoding-time buffer period and the network-responsive buffer period.

The transmission-time buffer period calculating means may select a greater one of the encoding-time buffer period and the network-responsive buffer period.

The network-responsive buffer period calculating means may set a network-jitter-responsive buffer period as the network-responsive buffer period, the network-jitter-responsive buffer period being a minimum buffer period necessary to prevent the synchronous reproduction from failing due to an increased delay caused by the network jitter of the network.

The transmitting apparatus may further include rate-ratio-responsive buffer period calculating means for calculating a rate-ratio-responsive buffer period, the rate-ratio-responsive buffer period being a minimum buffer period necessary to prevent the synchronous reproduction from failing due to a ratio of the transmission rate to an encoding rate at which the encoding means encodes the image data. The network-responsive buffer period calculating means may set, as the network-responsive buffer period, the rate-ratio-responsive buffer period calculated by the rate-ratio-responsive buffer period calculating means.

The network-responsive buffer period calculating means may set a retransmission-responsive buffer period as the network-responsive buffer period, the retransmission-responsive buffer period being a minimum buffer period necessary to prevent the synchronous reproduction from failing due to a delay caused by a retransmission process.

The network-responsive buffer period calculating means may set, as the network-responsive buffer period, a sum of a network-jitter-responsive buffer period, a rate-ratio-responsive buffer period, and a retransmission-responsive buffer period, the network-jitter-responsive buffer period being a minimum buffer period necessary to prevent the synchronous reproduction from failing due to an increased delay caused by the network jitter of the network, the rate-ratio-responsive buffer period being a minimum buffer period necessary to prevent the synchronous reproduction from failing due to a ratio of the transmission rate to an encoding rate at which the encoding means encodes the image data, the retransmission-responsive buffer period being a minimum buffer period necessary to prevent the synchronous reproduction from failing due to a delay caused by a retransmission process.

The network-responsive buffer period calculating means may set, as the network-responsive buffer period, a sum of a greater one of a network-jitter-responsive buffer period and a retransmission-responsive buffer period and a rate-ratio-responsive buffer period, the network-jitter-responsive buffer period being a minimum buffer period necessary to prevent the synchronous reproduction from failing due to an increased delay caused by the network jitter of the network, the retransmission-responsive buffer period being a minimum buffer period necessary to prevent the synchronous reproduction from failing due to a delay caused by a retransmission process, the rate-ratio-responsive buffer period being a minimum buffer period necessary to prevent the synchronous reproduction from failing due to a ratio of the transmission rate to an encoding rate at which the encoding means encodes the image data.

The network-responsive buffer period calculating means may set, as the network-responsive buffer period, a largest one of a network-jitter-responsive buffer period, a rate-ratio-responsive buffer period, and a retransmission-responsive buffer period, the network-jitter-responsive buffer period being a minimum buffer period necessary to prevent the synchronous reproduction from failing due to an increased delay caused by the network jitter of the network, the rate-ratio-responsive buffer period being a minimum buffer period necessary to prevent the synchronous reproduction from failing due to a ratio of the transmission rate to an encoding rate at which the encoding means encodes the image data, the retransmission-responsive buffer period being a minimum buffer period necessary to prevent the synchronous reproduction from failing due to a delay caused by a retransmission process.

The transmitting apparatus may further include encoding-time buffer period calculating means for calculating the encoding-time buffer period. The encoding-time buffer period adding means may add the encoding-time buffer period calculated by the encoding-time buffer period calculating means to the encoded data as the encoding header information.

The encoding-time buffer period calculating means may set, as the encoding-time buffer period, a value produced by dividing an encoding rate at which the image data is encoded by a buffer size used to encode the image data.

According to another embodiment of the present invention, a transmitting method includes the steps of encoding, by encoding means of a transmitting apparatus, image data to generate encoded data; adding, by encoding-time buffer period adding means of the transmitting apparatus, an encoding-time buffer period to the encoded data as encoding header information, the encoding-time buffer period being a minimum buffer period necessary to prevent synchronous reproduction in which the encoded data is decoded and reproduced in synchronization with a timestamp added to the encoded data from failing due to a delay caused by encoding of the image data; adding, by transmission-time buffer period adding means of the transmitting apparatus, a transmission-time buffer period to the encoded data as transmission header information different from the encoding header information, the transmission-time buffer period being a minimum buffer period necessary to prevent the synchronous reproduction from failing due to a delay caused by encoding of the image data and transmission of the encoded data; and transmitting, by transmitting means of the transmitting apparatus, via a network to another apparatus that performs the synchronous reproduction, the encoded data in which the encoding header information including the encoding-time buffer period has been added and in which the transmission header information including the transmission-time buffer period has been added.

According to still another embodiment of the present invention, a receiving apparatus includes receiving means for receiving encoded data transmitted via a network, the encoded data being generated by encoding image data by another apparatus; encoding-time buffer period obtaining means for obtaining an encoding-time buffer period by extracting the encoding-time buffer period from the encoded data received by the receiving means, the encoding-time buffer period being a minimum buffer period necessary to prevent synchronous reproduction in which the encoded data is decoded and reproduced in synchronization with a timestamp added to the encoded data from failing due to a delay caused by encoding of the image data; transmission-time buffer period obtaining means for obtaining a transmission-time buffer period by extracting the transmission-time buffer period from the encoded data received by the receiving means, the transmission-time buffer period being a minimum buffer period necessary to prevent the synchronous reproduction of the encoded data from failing due to a delay caused by encoding of the image data and transmission of the encoded data; initial buffer delay calculating means for calculating an initial buffer delay using the encoding-time buffer period obtained by the encoding-time buffer period obtaining means and the transmission-time buffer period obtained by the transmission-time buffer period obtaining means, the initial buffer delay being an initial value of a buffer period necessary to prevent the synchronous reproduction from failing; storing means for storing the encoded data received by the receiving means; synchronization control means for controlling the synchronous reproduction by controlling a read timing of the encoded data stored in the storing means; and decoding means for decoding the encoded data read by the storing means in accordance with control by the synchronization control means.

The initial buffer delay calculating means may set the transmission-time buffer period as the initial buffer delay when the transmission-time buffer period added to the encoded data is valid, and may set the encoding-time buffer period added to the encoded data as the initial buffer delay when the transmission-time buffer period is invalid.

According to still another embodiment of the present invention, a receiving method includes the steps of receiving, by receiving means of a receiving apparatus, encoded data transmitted via a network, the encoded data being generated by encoding image data by another apparatus; obtaining, by encoding-time buffer period obtaining means of the receiving apparatus, an encoding-time buffer period by extracting the encoding-time buffer period from the received encoded data, the encoding-time buffer period being a minimum buffer period necessary to prevent synchronous reproduction in which the encoded data is decoded and reproduced in synchronization with a timestamp added to the encoded data from failing due to a delay caused by encoding of the image data; obtaining, by transmission-time buffer period obtaining means of the receiving apparatus, a transmission-time buffer period by extracting the transmission-time buffer period from the received encoded data, the transmission-time buffer period being a minimum buffer period necessary to prevent the synchronous reproduction of the encoded data from failing due to a delay caused by encoding of the image data and transmission of the encoded data; calculating, by initial buffer delay calculating means of the receiving apparatus, an initial buffer delay using the obtained encoding-time buffer period and the obtained transmission-time buffer period, the initial buffer delay being an initial value of a buffer period necessary to prevent the synchronous reproduction from failing; storing, by storing means of the receiving apparatus, the received encoded data; controlling, by synchronization control means of the receiving apparatus, the synchronous reproduction by controlling a read timing of the stored encoded data; and decoding, by decoding means of the receiving apparatus, the read encoded data in accordance with the control.

According to an embodiment of the present invention, image data is encoded; encoded data is generated; an encoding-time buffer period that is a minimum buffer period necessary to prevent synchronous reproduction in which the encoded data is decoded and reproduced in synchronization with a timestamp added to the encoded data from failing due to a delay caused by encoding of the image data is added to the encoded data as encoding header information; a transmission-time buffer period that is a minimum buffer period necessary to prevent the synchronous reproduction from failing due to a delay caused by encoding of the image data and transmission of the encoded data is added to the encoded data as transmission header information different from the encoding header information; and the encoded data in which the encoding header information including the encoding-time buffer period and the transmission header information including the transmission-time buffer period have been added is transmitted via a network to another apparatus that performs the synchronous reproduction.

According to another embodiment of the present invention, encoded data that is generated by encoding image data by another apparatus and that is transmitted via a network is received; an encoding-time buffer period that is a minimum buffer period necessary to prevent synchronous reproduction in which the encoded data is decoded and reproduced in synchronization with a timestamp added to the encoded data from failing due to a delay caused by encoding of the image data is extracted from the received encoded data and is obtained; a transmission-time buffer period that is a minimum buffer period necessary to prevent the synchronous reproduction of the encoded data from failing due to a delay caused by encoding of the image data and transmission of the encoded data is extracted from the received encoded data and is obtained; an initial buffer delay that is an initial value of a buffer period necessary to prevent the synchronous reproduction from failing is calculated using the obtained encoding-time buffer period and the obtained transmission-time buffer period; the received encoded data is stored; the synchronous reproduction is controlled by controlling a read timing of the stored encoded data; and the read encoded data is decoded in accordance with the control.

According to the embodiments of the present invention, data can be transmitted. In particular, low-delay data transmission with reduced unnecessary delay periods can be performed in a more stable manner irrespective of the network status.

BRIEF DESCRIPTION OF THE DRAWINGS

FIG. 25 is a block diagram illustrating an example configuration of main elements of a computer according to an embodiment of the present invention.

DESCRIPTION OF THE PREFERRED EMBODIMENTS

Embodiments of the present invention will be described hereinafter. The description will be given in the following order:

1. First Embodiment (first transmitting/receiving system)
2. Second Embodiment (second transmitting/receiving system)
3. Third Embodiment (third transmitting/receiving system)
4. Fourth Embodiment (personal computer)

1. First Embodiment
Device Configuration

Figure 1:
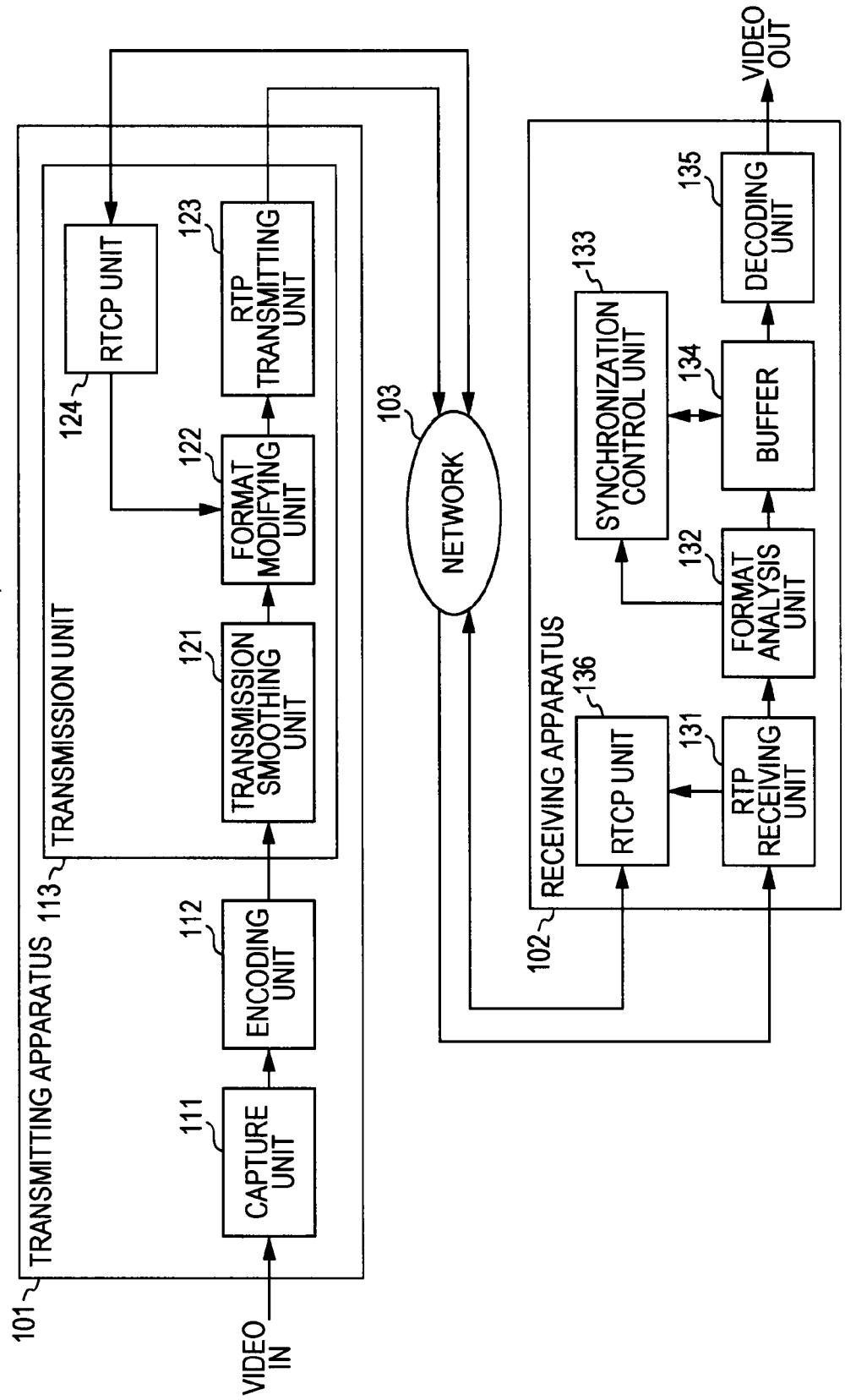
FIG. 1 is a block diagram illustrating an example configuration of main elements of a transmitting/receiving system according to an embodiment of the present invention.

First, the configuration of a transmitting/receiving system including a transmitting apparatus and a receiving apparatus according to an embodiment of the present invention will be described. FIG. 1 is a block diagram illustrating an example configuration of a transmitting/receiving system 100 according to an embodiment of the present invention.

As illustrated in FIG. 1, the transmitting/receiving system 100 may be a system that encodes image data and that transmits the encoded image data, and includes a transmitting apparatus 101 and a receiving apparatus 102. The transmitting apparatus 101 and the receiving apparatus 102 are connected to each other via a network 103, and communicate with each other.

Video data captured by the transmitting apparatus 101 is encoded, and the encoded video data is transmitted to the receiving apparatus 102 via the network 103 such as the Internet, and is reproduced synchronously.

In the transmitting/receiving system 100, data may be sent and received or network status information may be collected using, for example, Real-time Transport Protocol (RTP)/Real-time Transport Control Protocol (RTCP) as specified in Internet Engineering Task Force (IETF) Request for Comments (RFC) 3550.

As illustrated in FIG. 1, the transmitting apparatus 101 includes a capture unit 111, an encoding unit 112, and a transmission unit 113.

The capture unit 111 captures an input image (video IN) to obtain or generate image data. The capture unit 111 supplies the obtained (or generated) image data to the encoding unit 112. The encoding unit 112 encodes the image data to generate encoded data. The encoding unit 112 smoothes the generated encoded data, and supplies the resulting data to the transmission unit 113.

The transmission unit 113 transmits the encoded data to the receiving apparatus 102 via the network 103.

The transmission unit 113 includes a transmission smoothing unit 121, a format modifying unit 122, an RTP transmitting unit 123, and an RTCP unit 124.

The transmission smoothing unit 121 temporarily holds the encoded data and adjusts the output timing to smooth the bit rate of the encoded data so as to match the transmission rate at which the encoded data is transmitted to the receiving apparatus 102.

The transmission smoothing unit 121 supplies the output encoded data to the format modifying unit 122.

The format modifying unit 122 determines a transmission-time buffer period that is a delay period caused by data transmission in accordance with the status of the network 103, which is obtained from the RTCP unit 124, and sets the resulting value in a specified field in the transmission format.

The format modifying unit 122 modifies the format in this manner, as necessary, and then supplies the encoded data whose format has been modified to the RTP transmitting unit 123.

The RTP transmitting unit 123 converts the encoded data into a packet in accordance with RTP, and sends the obtained RTP packet to the network 103 so as to be addressed to the receiving apparatus 102. The RTP packet sent from the RTP transmitting unit 123 is transmitted to the receiving apparatus 102 via the network 103.

The RTCP unit 124 communicates with an RTCP unit 136 in the receiving apparatus 102 via the network 103 in accordance with RTCP, and collects network status information that may be information regarding the status of the network 103 or the like, which includes jitter in the data transmission path between the transmitting apparatus 101 and the receiving apparatus 102, the rate at which transmission can be performed, and the packet loss rate.

The network jitter may be measured by, for example, sending and receiving packets a plurality of times. Depending on the network, the maximum value of jitter may be guaranteed. When such a network is used as a transmission path, the maximum value of jitter may be utilized.

The RTCP unit 124 supplies the collected information to the format modifying unit 122. As described above, the format modifying unit 122 calculates a transmission-time buffer period in accordance with the information supplied from the RTCP unit 124.

As illustrated in FIG. 1, the receiving apparatus 102 includes an RTP receiving unit 131, a format analysis unit 132, a synchronization control unit 133, a buffer 134, a decoding unit 135, and the RTCP unit 136.

The RTP receiving unit 131 receives an RTP packet transmitted from the transmitting apparatus 101 via the network 103. The RTP receiving unit 131 extracts encoded data from the received RTP packet, and supplies the encoded data to the format analysis unit 132.

The format analysis unit 132 extracts an encoding-time buffer period and a transmission-time buffer period added to the encoded data, and supplies the extracted periods to the synchronization control unit 133. The format analysis unit 132 further supplies the processed encoded data to the buffer 134 to accumulate the encoded data in the buffer 134.

The synchronization control unit 133 controls the data output timing of the buffer 134. The synchronization control unit 133 determines an appropriate buffer period using a timestamp value, an encoding-time buffer period, and a transmission-time buffer period included in each encoded data, and controls, based on the determined information, the timing at which the buffer 134 outputs the encoded data.

The buffer 134 stores the encoded data supplied from the format analysis unit 132. The buffer 134 is controlled by the synchronization control unit 133 to supply the stored encoded data to the decoding unit 135 at a predetermined timing.

The decoding unit 135 decodes the encoded data supplied from the buffer 134, and outputs the obtained decoded image data so that the image data can be reproduced synchronously (video OUT).

Next, the details of each apparatus will be described. First, the transmitting apparatus 101 will be described.

Encoding Unit

Figure 2:
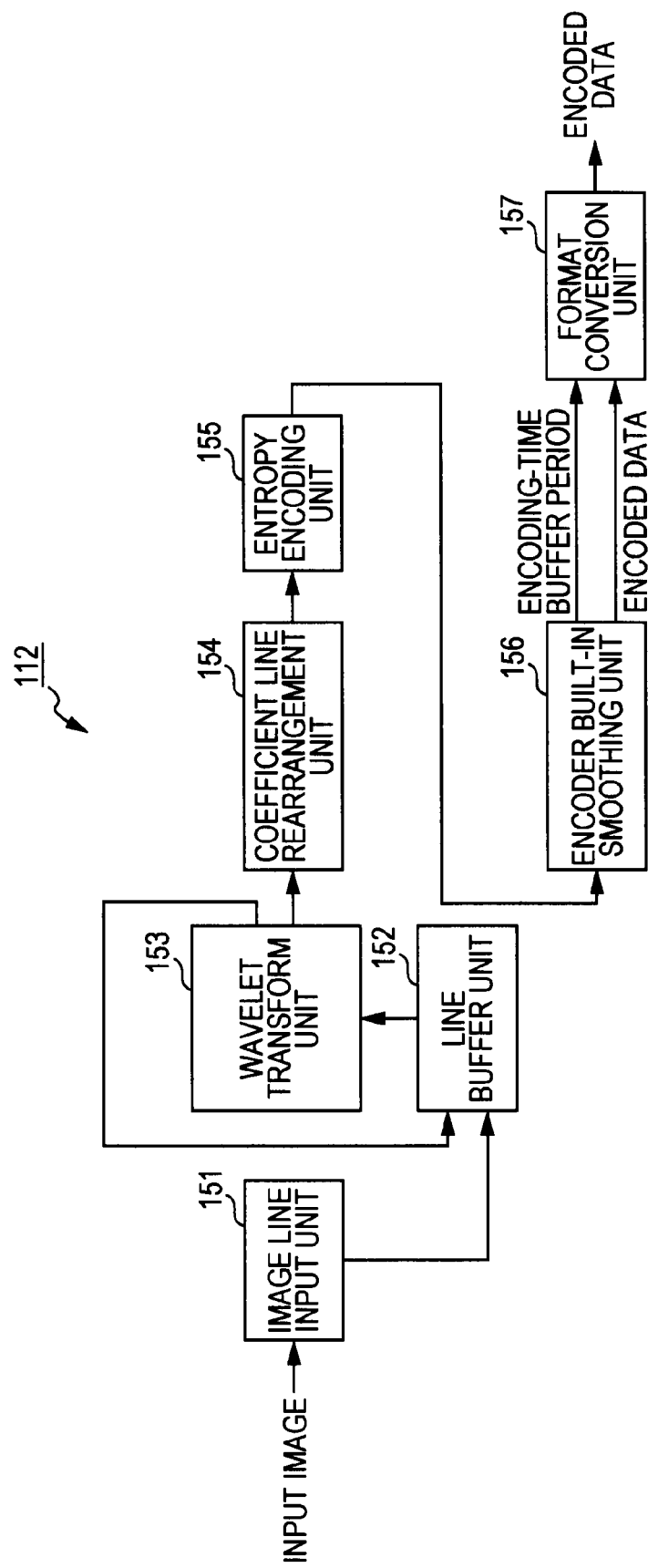
FIG. 2 is a block diagram illustrating a detailed example configuration of an encoding unit.

FIG. 2 is a block diagram illustrating a detailed example configuration of the encoding unit 112 illustrated in FIG. 1.

In FIG. 2, the encoding unit 112 includes an image line input unit 151, a line buffer unit 152, a wavelet transform unit 153, a coefficient line rearrangement unit 154, an entropy encoding unit 155, an encoder built-in smoothing unit 156, and a format conversion unit 157.

The image line input unit 151 supplies input image data to the line buffer unit 152 on a line-by-line basis to accumulate the image data in the line buffer unit 152. The line buffer unit 152 holds the image data supplied from the image line input unit 151 or coefficient data supplied from the wavelet transform unit 153, and supplies the image data or the coefficient data to the wavelet transform unit 153 at a predetermined timing.

The wavelet transform unit 153 performs a wavelet transform on the image data or coefficient data supplied from the line buffer unit 152, and generates coefficient data of the low-frequency component and high-frequency component in the next hierarchy.

The wavelet transform unit 153 supplies the vertically and horizontally low-frequency component of the generated coefficient data to the line buffer unit 152 to hold the component therein, and supplies the other components to the coefficient line rearrangement unit 154. If the generated coefficient data corresponds to the top layer, the wavelet transform unit 153 also supplies the vertically and horizontally low-frequency component to the coefficient line rearrangement unit 154.

Further, when performing lifting calculation as described below, the wavelet transform unit 153 holds the data that is being calculated, and uses the data for the next analysis filtering. The wavelet transform unit 153 executes a wavelet transform until a predetermined number of division levels is reached.

The coefficient line rearrangement unit 154 receives coefficient data (coefficient lines) from the wavelet transform unit 153. The coefficient line rearrangement unit 154 rearranges the coefficient data (coefficient lines) in the order of the wavelet inverse transform processing.

The coefficient line rearrangement unit 154 holds the coefficient lines supplied from the wavelet transform unit 153 into a built-in storage unit, and further reads the held coefficient lines. In this case, the coefficient line rearrangement unit 154 reads the held coefficient lines in the order of the wavelet inverse transform processing to rearrange the coefficient lines. The details of the rearrangement operation will be described below.

The coefficient line rearrangement unit 154 supplies the rearranged coefficient data to the entropy encoding unit 155.

The entropy encoding unit 155 encodes the coefficient data supplied from the coefficient line rearrangement unit 154 using a predetermined entropy encoding scheme such as Huffman coding or arithmetic coding. The entropy encoding unit 155 supplies the generated encoded data to the encoder built-in smoothing unit 156.

The encoder built-in smoothing unit 156 smoothes the bit rate of the supplied encoded data so as to match a predetermined encoding rate by temporarily holding the encoded data. The encoder built-in smoothing unit 156 supplies the smoothed encoded data to the format conversion unit 157 by reading the accumulated encoded data at a predetermined timing.

In this case, the encoder built-in smoothing unit 156 calculates an encoding-time buffer period that is a delay period caused by the encoding process of the encoding unit 112, and supplies information about the calculated encoding-time buffer period to the format conversion unit 157.

The format conversion unit 157 adds encoding information including the encoding-time buffer period supplied from the encoder built-in smoothing unit 156 to the encoded data supplied from the encoder built-in smoothing unit 156 as header information (encoding header information). Thus, the format of the encoded data is converted into a transmission format.

After the conversion of the format of the encoded data, the format conversion unit 157 supplies the resulting encoded data to the transmission smoothing unit 121 (FIG. 1) of the transmission unit 113.

Subband

Next, the wavelet transform will be described. The wavelet transform is a process for transforming image data into hierarchical coefficient data of each frequency component by recursively iterating analysis filtering on the generated low-frequency components for dividing the image data into the high spatial frequency component (high-frequency component) and the low spatial frequency component (low-frequency component). In the following description, it is assumed that the division level is low for a hierarchy of high-frequency components and is high for a hierarchy of low-frequency components.

In one hierarchy (division level), analysis filtering is performed on both the horizontal and vertical directions. Thus, the coefficient data (image data) of one hierarchy is divided into four types of components by using the analysis filtering of one hierarchy. The four types of components are a horizontally and vertically high-frequency component (HH), a horizontally high-frequency and vertically low-frequency component (HL), a horizontally low-frequency and vertically high-frequency component (LH), and a horizontally and vertically low-frequency component (LL).

The respective component sets are referred to as "subbands" (LL, LH, HL, and HH).

Then, the analysis filtering of the next hierarchy is performed on the horizontally and vertically low-frequency component (LL) among the generated four subbands.

The recursive iteration of analysis filtering in this way allows the coefficient data in the low spatial frequency band to be divided into smaller regions (low-frequency components). Therefore, efficient encoding can be performed by encoding the thus wavelet-transformed coefficient data.

Figure 3:
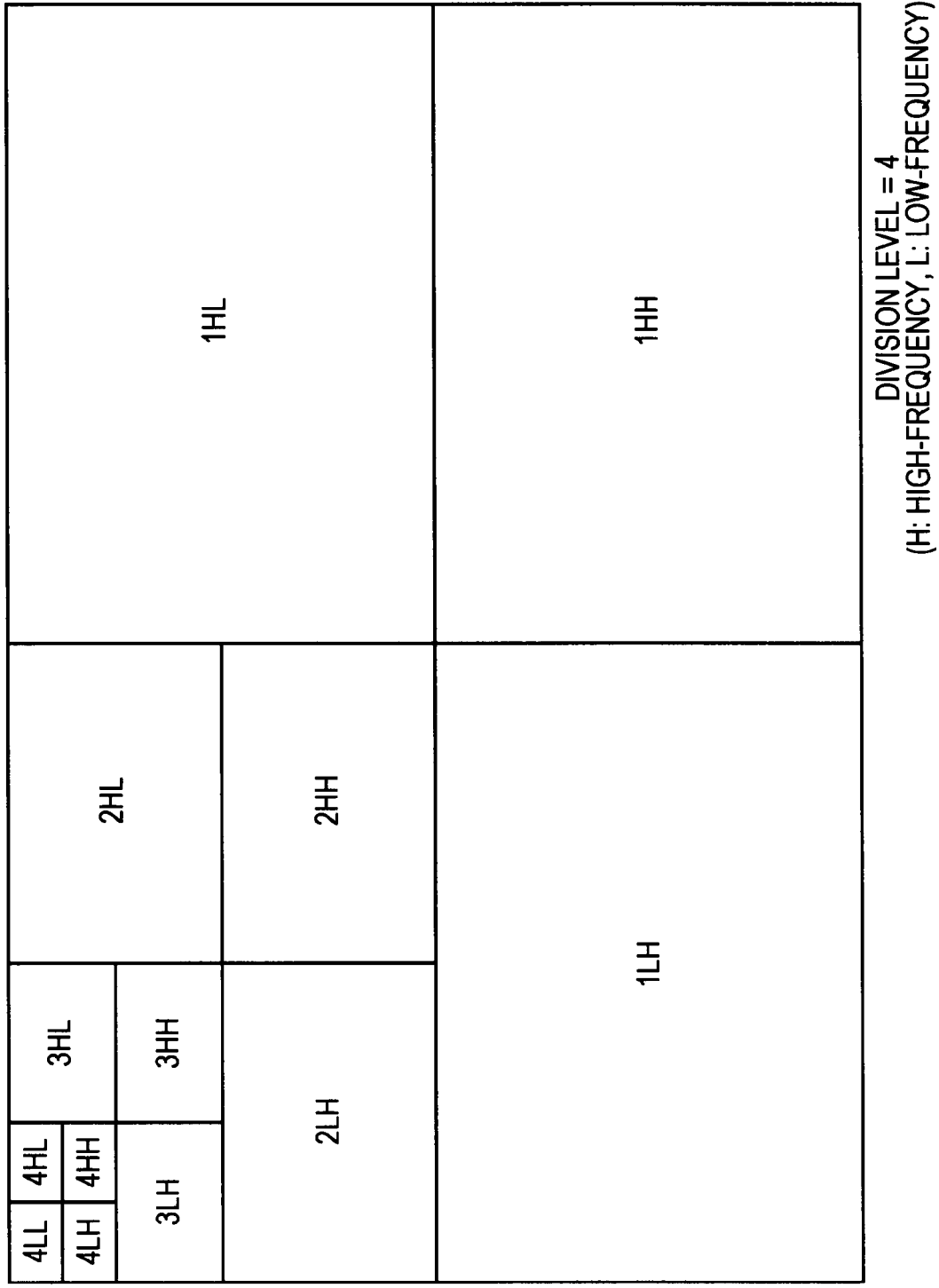
FIG. 3 is a diagram illustrating an example of a subband.

FIG. 3 illustrates the configuration of coefficient data divided into 13 subbands (1LH, 1HL, 1HH, 2LH, 2HL, 2HH, 3LH, 3HL, 3HH, 4LL, 4LH, 4HL, and 4HH) up to division level 4 by iterating the analysis filtering four times.

Line Block

Figure 4:
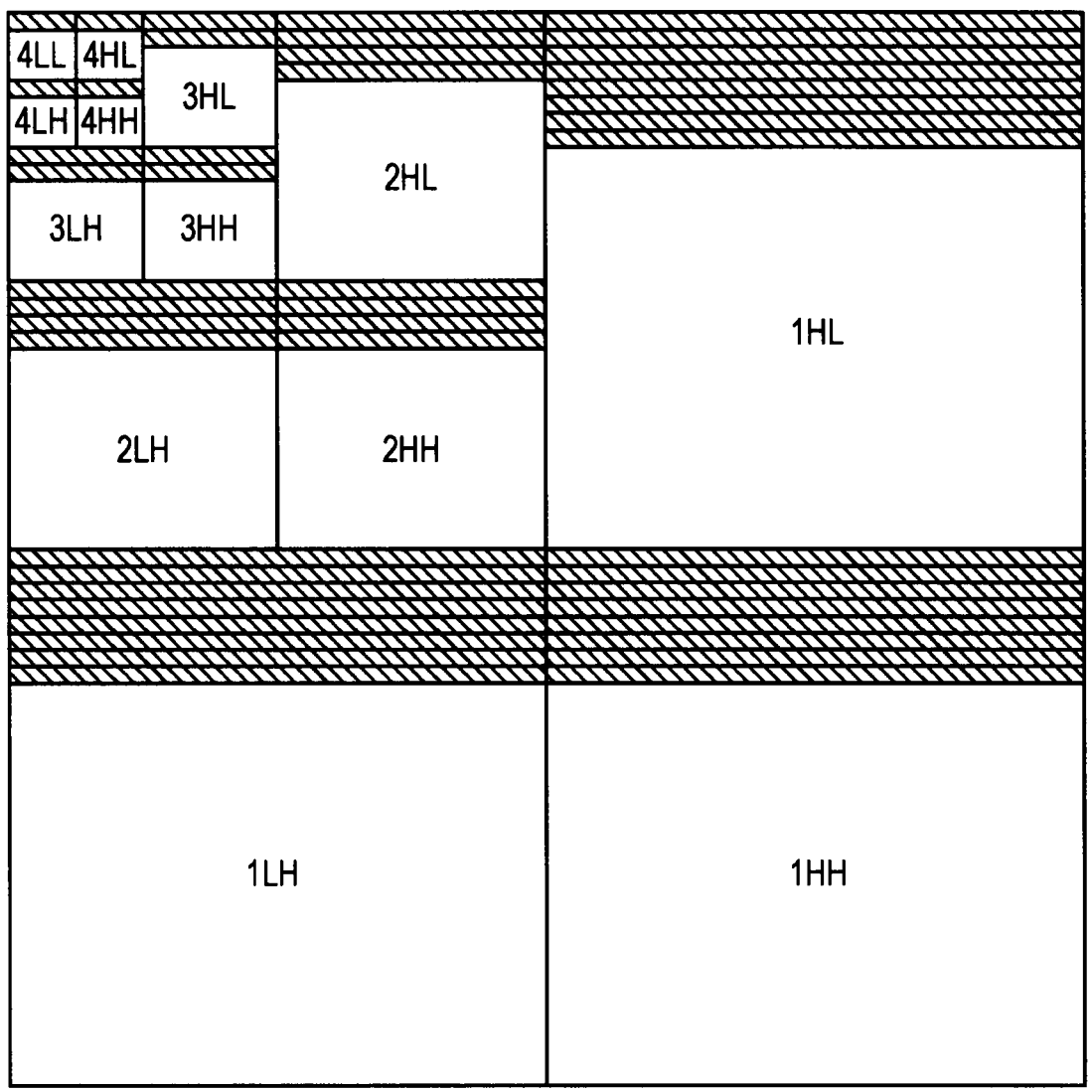
FIG. 4 is a diagram illustrating a line block.

Next, a line block will be described. FIG. 4 is a diagram illustrating a line block. The analysis filtering in the wavelet transform generates, from image data or coefficient data of two lines to be processed, coefficient data of four subbands in the upper hierarchy on a line-by-line basis.

For example, when the number of division levels is four, as indicated by the hatched portions in FIG. 4, in order to generate coefficient data of the subband of division level 4 corresponding to the top hierarchy on a line-by-line basis, two lines are necessary for the subband 3LL, four lines are necessary for the subband 2LL, and eight lines are necessary for the subband 1LL. That is, 16 lines of baseband image data are necessary.

The image data of the number of lines necessary to generate one line of coefficient data of the subband of the lowest-frequency component is referred to as a "line block" (or a "precinct").

For example, when the number of division levels is N, a number of lines of baseband image data, which is equal to 2 raised to Nth power, are used to generate one line of coefficient data of the subband of the lowest-frequency component. This is the number of lines of the line block.

A line block also denotes a coefficient data set of each subband obtained by wavelet transforming the image data of the line block.

Furthermore, the term "line" refers to a sequence of pixels in the horizontal direction of one line of a frame image (picture) or a sequence of coefficients in the horizontal direction of one line of a subband. One line of coefficient data is also referred to as a "coefficient line". In the following description, an appropriate expression is used for more detailed distinction.

One line of encoded data for which one coefficient line (one line of coefficient data) has been encoded is also referred to as a "code line".

In the wavelet transform process performed by the wavelet transform unit 153, analysis filtering is performed on every two lines of image data (or coefficient data). In this case, two lines are selected in the order that allows processing to be performed at a delay as low as possible.

More specifically, every two lines of image data (coefficient data) are selected in the order that allows coefficient data of a higher-order (lower-frequency) subband to be generated as preferentially as possible, and are subjected to analysis filtering.

5×3 Filter

Next, analysis filtering will be described.

The wavelet transform process may be performed using a filter bank generally composed of a low-pass filter and a high-pass filter.

A specific example of the wavelet transform will be described in the context of a method using a 5×3 filter.

The impulse response (Z-transform representation) of the 5×3 filter is represented by, as given in Equations (1) and (2) below, a low-pass filter $H_0(z)$ and a high-pass filter $H_1(z)$. It is found from Equations (1) and (2) that the low-pass filter $H_0(z)$ has five taps and the high-pass filter $H_1(z)$ has three taps.

$$H_0(z)=(-1+2z^{-1}+6z^{-2}+2z^{-3}-z^{-4})/8 \quad (1)$$

$$H_1(z)=(-1+2z^{-1}-z^{-2})/2 \quad (2)$$

According to Equations (1) and (2), the coefficients of the low-frequency component and the high-frequency component can be calculated directly. Here, the use of the lifting technique can result in a reduction in the amount of calculation in the filtering process.

Figure 5:
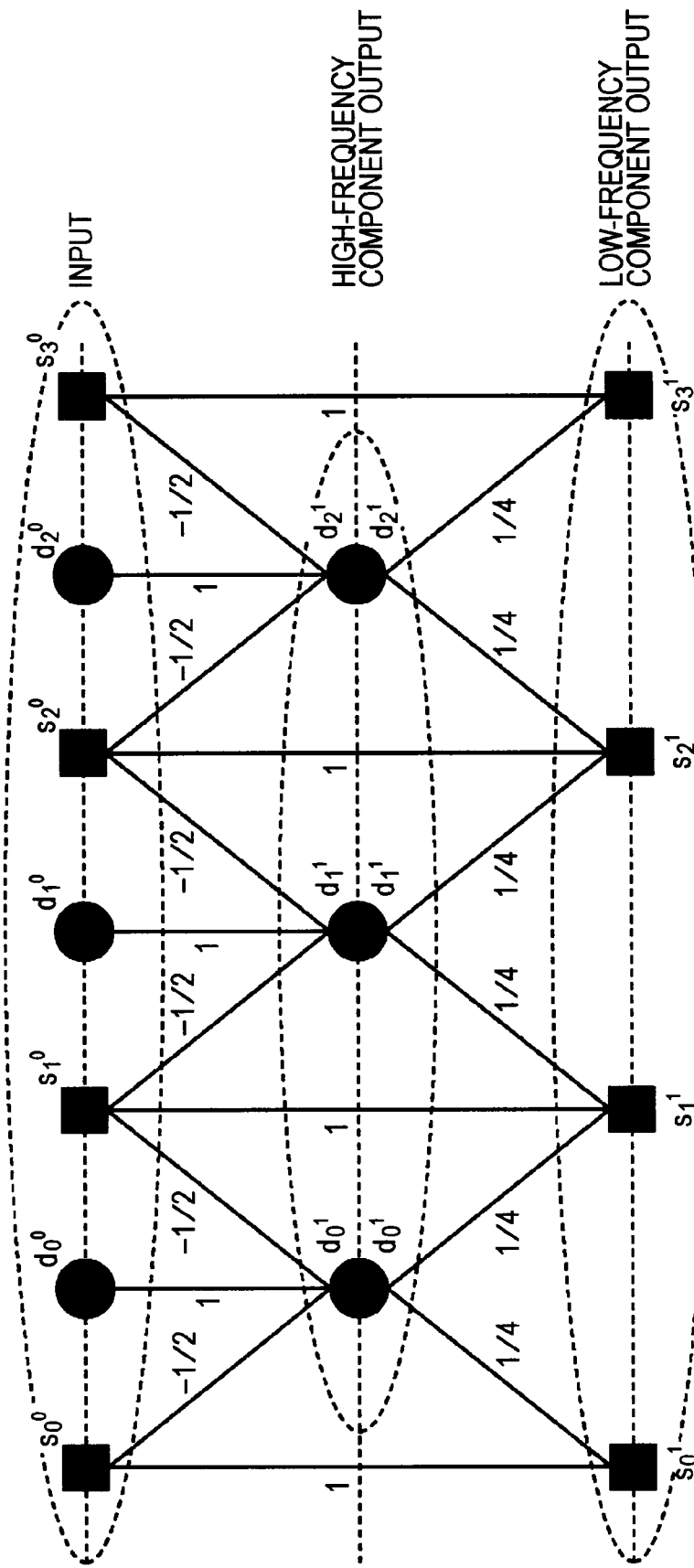
FIG. 5 is a diagram illustrating an example of a 5×3 filter.

FIG. 5 is a diagram illustrating the lifting representation of a 5×3 filter. One sequence in the top portion of FIG. 5 is an input signal sequence. Data processing flows from the top to the bottom of the screen, and the coefficients of the high-frequency components (high-frequency coefficients) and the coefficients of the low-frequency components (low-frequency coefficients) are output using Equations (3) and (4) as follows:

$$d_i^1=d_i^0-\tfrac{1}{2}(s_i^0+s_{i+1}^0) \quad (3)$$

$$s_i^1=s_i^0+\tfrac{1}{4}(d_{i-1}^1+d_i^1) \quad (4)$$

Lifting Calculation

Figure 6:
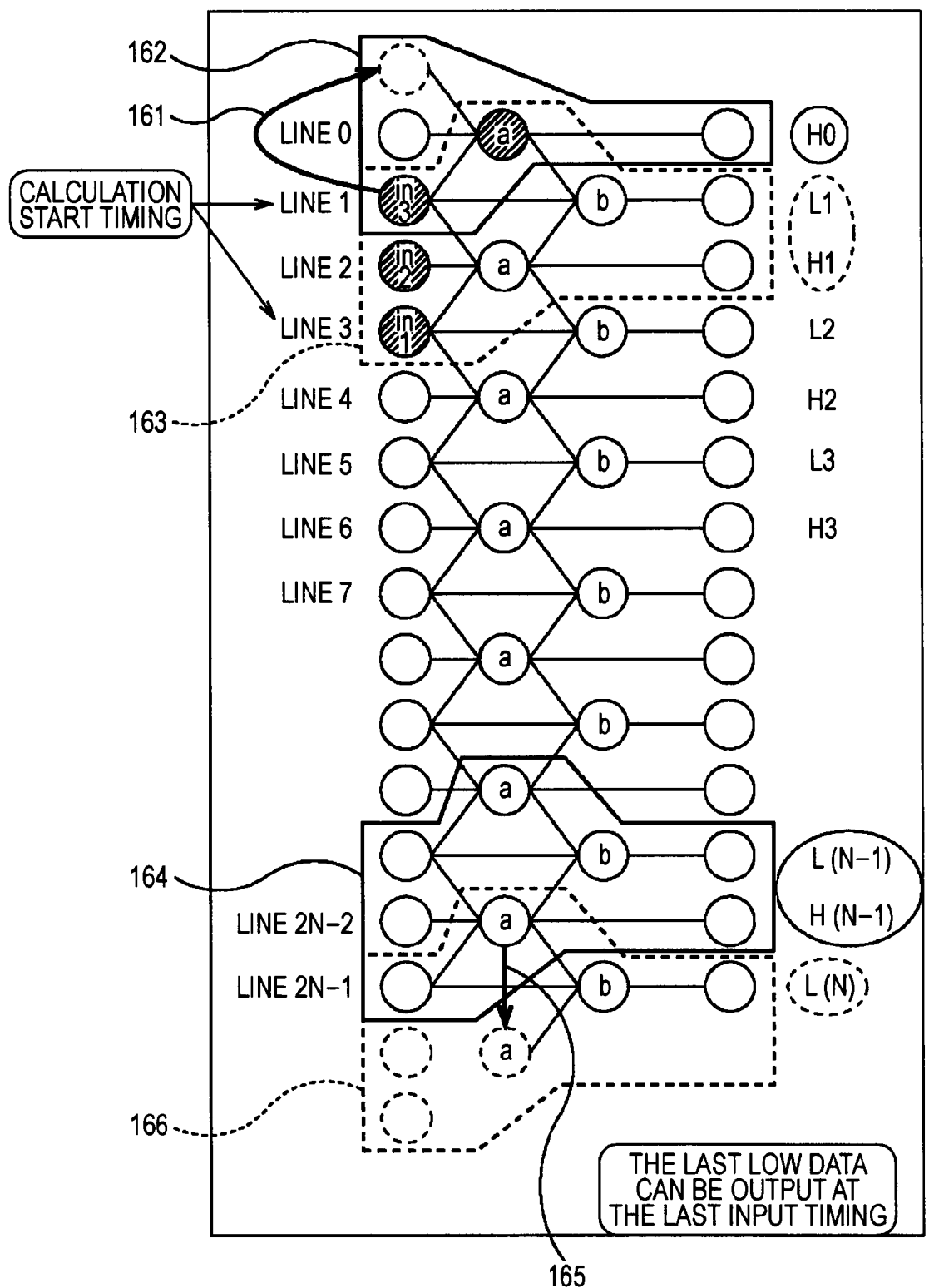
FIG. 6 is a diagram illustrating an example of lifting calculation.

Next, the lifting calculation will be described. FIG. 6 is a diagram illustrating the lifting representation of filtering performed on lines in the longitudinal direction using a 5×3 analysis filter.

In the transverse direction, the calculation steps and low-frequency and high-frequency coefficients generated in the respective steps are illustrated. As compared with FIG. 5, it is found that the calculation methods are similar although the horizontal direction is merely changed to the vertical direction.

At the upper end of the image, as indicated by an arrow 161, the highest-order line is symmetrically extended from Line 1 to a portion indicated by a dotted line, and one line is interpolated. As indicated by a frame 162, lifting calculation is performed using the interpolated line and Lines 0 and 1, that is, a total of three lines, and a coefficient "a" is generated by the calculation of Step 1. This is a high-frequency coefficient (H0).

When Lines 1, 2, and 3 are input, the next high-frequency coefficient "a" is calculated using these three lines according to Equation (3). This is a high-frequency coefficient (H1). Then, the calculation using the first high-frequency coefficient "a" (H0), the second high-frequency coefficient "a" (H1), and the coefficient of Line 1, that is, a total of three coefficients, according to Equation (4) yields a coefficient "b". This is a low-frequency coefficient (L1). That is, as indicated by a frame 163, a low-frequency coefficient (L1) and a high-frequency coefficient (H1) are generated using three lines, namely, Lines 1, 2, and 3, and also using the high-frequency coefficient (H0).

Thereafter, each time two lines are input, the above lifting calculation is repeatedly performed on the subsequent lines in a similar manner, and a low-frequency coefficient and a high-frequency coefficient are output. Then, as indicated by a frame 164, when a low-frequency coefficient (L(N−1)) and a high-frequency coefficient (H(N−1)) are generated, the high-frequency coefficient (H(N−1)) is symmetrically extended in a manner indicated by an arrow 165, and the calculation is performed in a manner indicated by a frame 166. Then, a low-frequency component (L(N)) is generated.

While FIG. 6 illustrates an example in which the filtering performed on lines in the vertical direction, it is to be understood that the filtering in the horizontal direction may be performed in a similar manner.

The above lifting calculation is performed on each hierarchy. In this regard, as described above, the analysis filtering is performed in the order that allows a lower-frequency component to be generated more preferentially. The order described with reference to FIG. 6 represents the dependence relationship between data items to be subjected to analysis filtering, which is different from the order in which the processing is actually executed.

Process of One Line Block

Next, the execution procedure of the analysis filtering will be described.

Image data (coefficient data) to be processed is processed in order from the upper line of the picture (subband). The lifting calculation of the analysis filtering is executed each time two lines of image data (coefficient data) to be processed are prepared (that is, when the lifting calculation becomes executable). It is noted that a lower-frequency subband is processed more preferentially.

As described below, the analysis filtering is repeatedly executed using the same procedure for each line block. The procedure of the analysis filtering for a line block (steady-state line block) to be subjected to analysis filtering each time two lines are prepared will now be described.

In a line block (initial-state line block) including the upper end of the picture or subband in the initial state, the number of lines necessary for the analysis filtering is different from that of other line blocks (steady-state line blocks). However, also in the case of the initial-state line block, the processing procedure of analysis filtering is basically similar to that of the other line blocks, and the description thereof is thus omitted.

Figure 7:
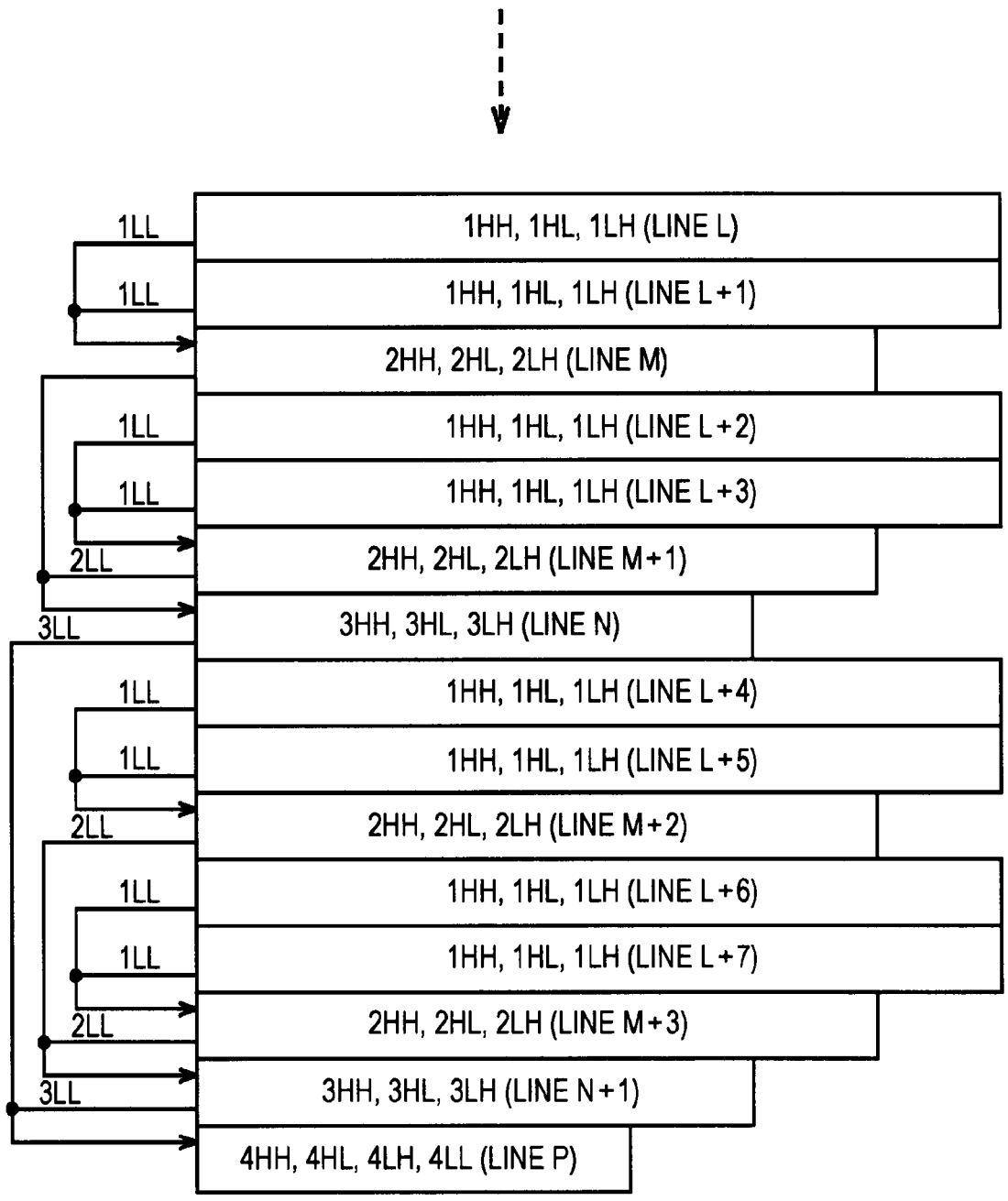
FIG. 7 is a diagram illustrating the output order of coefficient data in a steady state.

FIG. 7 is a diagram illustrating the output order of coefficient data in the steady state. In FIG. 7, wavelet-transformed coefficient data is arranged in the time-series order in the direction from the top to the bottom of FIG. 7.

In a steady-state line block, first, the top two lines of baseband image data in the line block are subjected to analysis filtering, and a line L of division level 1 (the Lth coefficient line from the top) is generated. Since one line of coefficient data is not sufficient for analysis filtering, the next two lines of the baseband image data are subjected to analysis filtering at the next timing, and a line (L+1) (the (L+1)th coefficient line from the top) of division level 1 is generated.

At this time, two lines of coefficient data of division level 1 are prepared. Then, analysis filtering of division level 1 is performed on the two lines of coefficient data of division level 1, and a line M of division level 2 (the Mth coefficient line from the top) is generated. However, the analysis filtering of division level 2 is not yet ready to execute because of one line. In addition, since coefficient data of division level 1 is not prepared at this time, the analysis filtering of division level 1 is not executable.

Thus, the next two lines of the baseband image data is subjected to analysis filtering, and a line (L+2) (the (L+2)th coefficient line from the top) of division level 1 is generated. Since one line of coefficient data is not sufficient for analysis filtering, subsequently, the next two lines of the baseband image data are subjected to analysis filtering, and a line (L+3) (the (L+3)th coefficient line from the top) of division level 1 is generated.

Since two lines of coefficient data of division level 1 are prepared, then, analysis filtering of division level 1 is performed on the two lines of coefficient data of division level 1, and a line (M+1) (the (M+1)th coefficient line from the top) of division level 2 is generated.

Thus, two lines of coefficient data of division level 2 are prepared. Then, analysis filtering of division level 2 is performed on the two lines of coefficient data of division level 2, and a line N of division level 3 (the Nth coefficient line from the top) is generated.

Subsequently, similarly, a line (L+4) (the (L+4)th coefficient line from the top) and a line (L+5) (the (L+5)th coefficient line from the top) of division level 1, a line (M+2) (the (M+2)th coefficient line from the top) of division level 2, a line (L+6) (the (L+6)th coefficient line from the top) and a line (L+7) (the (L+7)th coefficient line from the top) of division level 1, a line (M+3) (the (M+3)th coefficient line from the top) of division level 2, and a line (N+1) (the (N+1)th coefficient line from the top) of division level 3 are sequentially generated.

Since two lines of coefficient data of division level 3 are prepared, then, analysis filtering of division level 3 is performed on the two lines of coefficient data of division level 3, and a line P (the Pth coefficient line from the top) of division level 4 is generated.

In the above way, analysis filtering for one line block is performed. That is, the procedure as above is repeatedly performed for each line block.

Coefficient Rearrangement

Next, the rearrangement of coefficient data by the coefficient line rearrangement unit 154 will be described with reference to FIG. 8.

Figure 8:
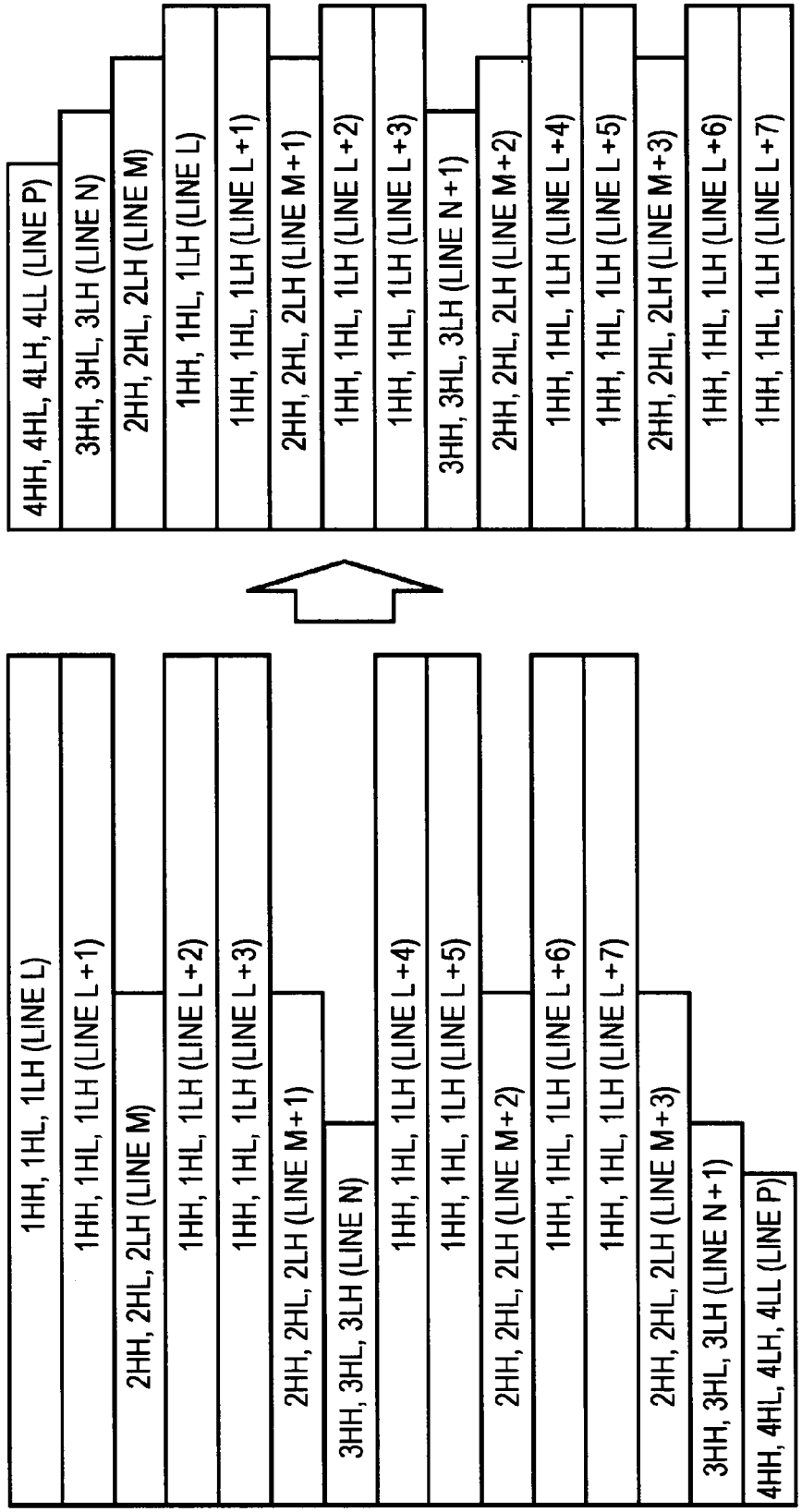
FIG. 8 is a diagram illustrating the rearrangement of coefficients.

In FIG. 8, the coefficient lines are arranged in the order to be processed. Time flows from the top to the bottom of FIG. 8. That is, the coefficient lines illustrated in FIG. 8 are processed in order from the top of FIG. 8.

The coefficient data is output from the wavelet transform unit 153 in the order (wavelet transform output order) as indicated on the left side of FIG. 8.

The coefficient line rearrangement unit 154 rearranges the coefficient data in the order from the low-frequency components to the high-frequency components as indicated on the right side of FIG. 8.

More specifically, the coefficient line rearrangement unit 154 reads the coefficient line of the line P of division level 4, the coefficient line of the line N of division level 3, the coefficient line of the line M of division level 2, and the coefficient lines of the lines L and (L+1) of division level 1, and supplies the read coefficient lines to the entropy encoding unit 155 in the read order.

Then, the coefficient line rearrangement unit 154 further reads the coefficient line of the line (M+1) of division level 2 and the coefficient lines of the lines (L+2) and (L+3) of division level 1, and supplies the read coefficient lines to the entropy encoding unit 155 in the read order.

The coefficient line rearrangement unit 154 further reads the coefficient line of the line (N+1) of division level 3, the coefficient line of the line (M+2) of division level 2, and the coefficient lines of the lines (L+4) and (L+5) of division level 1, and supplies the read coefficient lines to the entropy encoding unit 155 in the read order.

Then, the coefficient line rearrangement unit 154 further reads the coefficient line of the line (M+3) of division level 2 and the coefficient lines of the lines (L+6) and (L+7) of division level 1, and supplies the read coefficient lines to the entropy encoding unit 155 in the read order.

The entropy encoding unit 155 processes the coefficient lines in the order supplied. That is, as illustrated on the right side of FIG. 8, the coefficient lines are transmitted to the receiving apparatus 102 in the order to be subjected to wavelet inverse transform processing.

The decoding unit 135 of the receiving apparatus 102 combines the coefficient lines in this order, as described below. This allows the decoding unit 135 of the receiving apparatus 102 to decode the received encoded data with a low delay without increasing an unnecessary waiting time.

Encoding-Time Buffer Period

The unit of capture in the capture operation of the transmitting apparatus 101 may be based on synchronous reproduction in which the receiving apparatus 102 performs reproduction at the same intervals as the capture time intervals. For example, the unit of capture may be video frames or segments into which a video frame is divided.

However, in the encoding process, the encoded data size in the unit of capture is generally non-uniform. If smoothing to a constant transmission rate is performed before transmission, due to the non-uniformity of the data size, the delays caused by the smoothing process may differ depending on the unit of capture.

Thus, at the time of the start of reproduction of a stream, the receiving apparatus 102 starts reproduction after performing buffering in accordance with an initial buffer delay which is set to the maximum delay. Thus, the receiving apparatus 102 can also reproduce the subsequent data synchronously from the initial data reproduction time without exhausting the buffer 134 (or can perform synchronous reproduction without causing failure).

Figure 9:
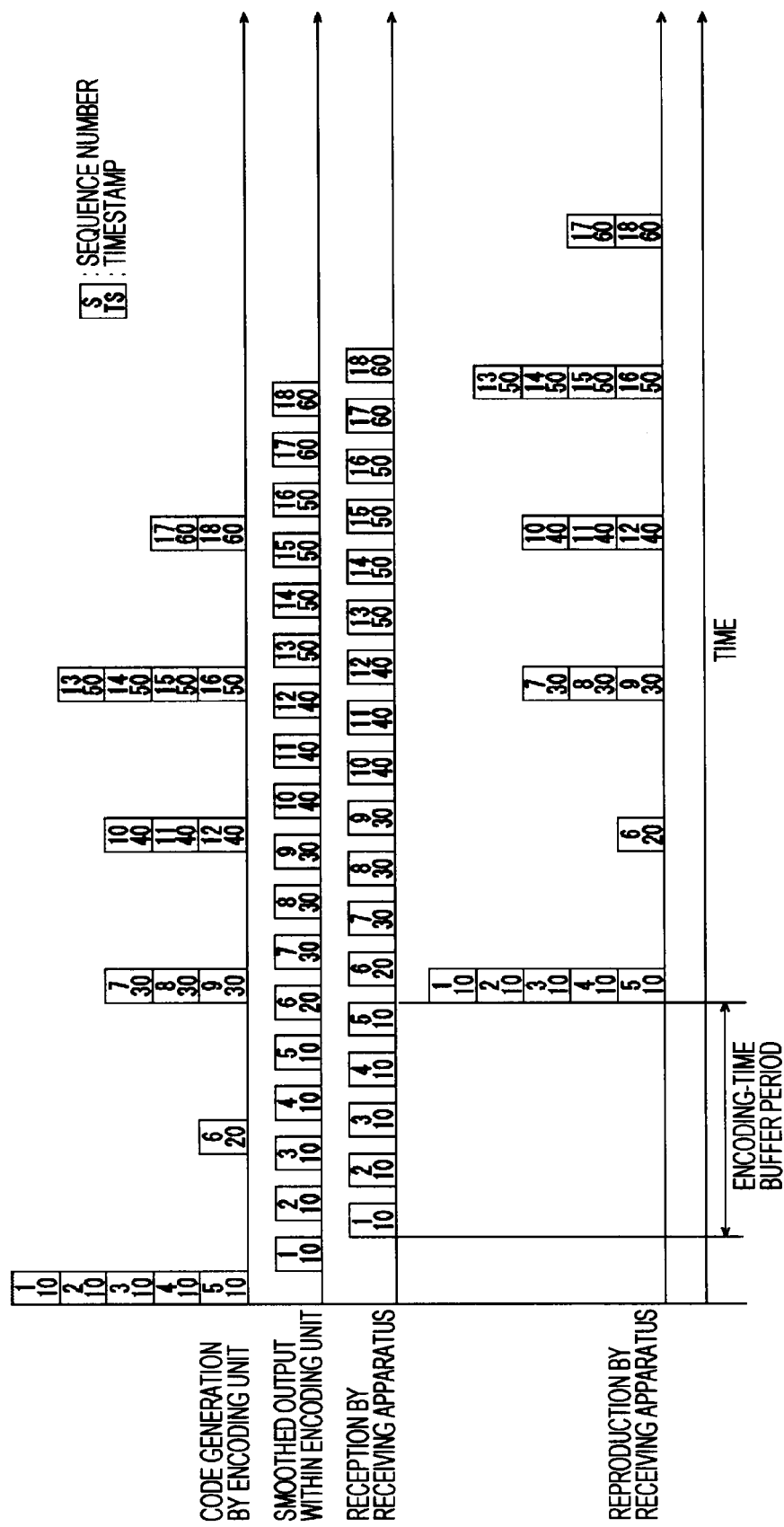
FIG. 9 is a diagram illustrating an encoding-time buffer period.

First, attention will be focused on the encoding-time buffer period. FIG. 9 is a diagram illustrating an encoding-time buffer period. In FIG. 9, as indicated by arrows, time flows from the left to the right of FIG. 9.

As indicated in the top portion of FIG. 9, a code generation output from the entropy encoding unit 155 (CODEC code generation) is output after a timestamp synchronized with the capture time is added. The output data size in the unit of capture is non-uniform, and the number of packets produced by RTP packetization is also non-uniform. Thus, as indicated in the second portion from the top of FIG. 9, the encoder built-in smoothing unit 156 performs a smoothing process (smoothed output within CODEC).

In order not to cause failure of synchronous reproduction, it is desirable that the receiving apparatus 102 perform buffering of the encoded data for a period that can correspond to at least the delay period caused by this encoding process.

That is, the receiving apparatus 102 determines an initial buffer delay necessary for synchronous reproduction by taking into account an encoding-time buffer period that is a delay period caused by the encoding process by the encoding unit 112.

For example, the entropy encoding unit 155 may control the encoding rate so as not to cause the bucket to overflow, where the bucket size in the token-bucket behavior as specified in the International Telecommunication Union-Telecommunication Standardization Sector (ITU-T) Recommendation Y.1221 is set as the expected buffer size B (byte) of the encoder and the bucket rate R (bps) is set as the encoding rate. Further, the encoder built-in smoothing unit 156 performs an operation similar to that of the token-bucket behavior.

In this case, an encoding-time buffer period Bt_codec (sec) can be determined according to, for example, Equation (5) as follows:

$$Bt\_codec = B \times 8/R \quad (5)$$

That is, the encoding-time buffer period can be determined by dividing the buffer size by the encoding rate.

Format Modifying Unit

Figure 10:
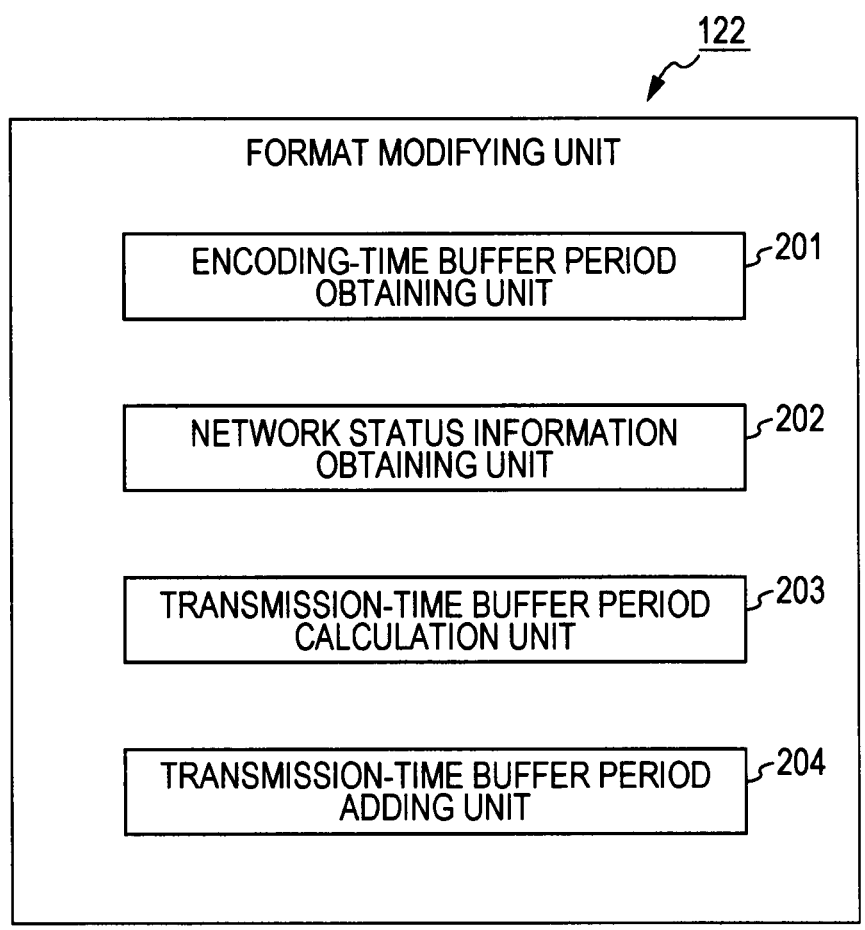
FIG. 10 is a block diagram illustrating a detailed example configuration of a format modifying unit.

Next, the format modifying unit 122 illustrated in FIG. 1 will be described. FIG. 10 is a functional block diagram illustrating the functions of the format modifying unit 122.

As illustrated in FIG. 10, the format modifying unit 122 includes, as functional blocks, an encoding-time buffer period obtaining unit 201, a network status information obtaining unit 202, a transmission-time buffer period calculation unit 203, and a transmission-time buffer period adding unit 204.

The encoding-time buffer period obtaining unit 201 obtains the encoding-time buffer period added to the encoded data. The network status information obtaining unit 202 obtains the network status information collected by the RTCP unit 124.

The transmission-time buffer period calculation unit 203 calculates a transmission-time buffer period from the network status information obtained by the network status information obtaining unit 202. The transmission-time buffer period adding unit 204 sets information including the transmission-time buffer period calculated by the transmission-time buffer period calculation unit 203 into a specified field in the header of the encoded data.

Transmission Format

Figure 11A:
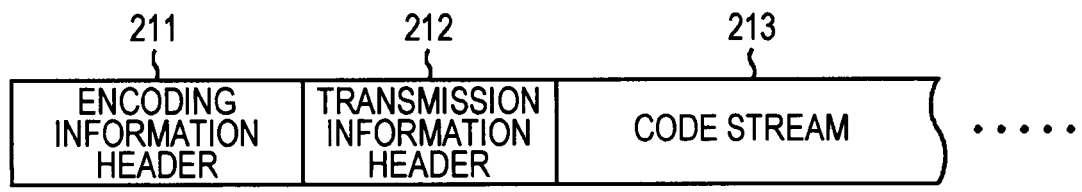
FIGS. 11A to 11C are diagrams illustrating an example configuration of transmission data.
Figure 11B:
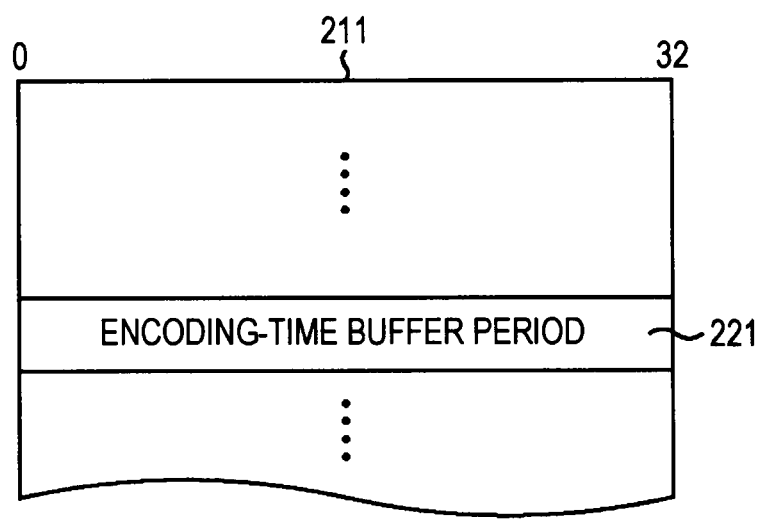
Figure 11C:
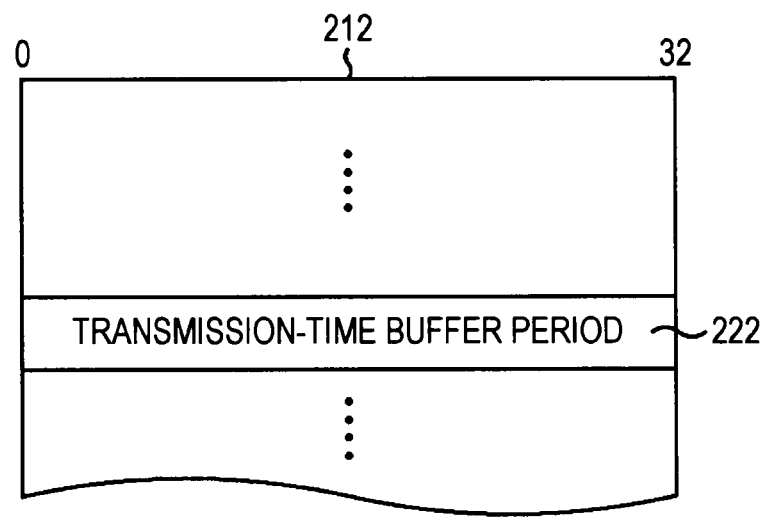

FIGS. 11A to 11C illustrate an example configuration of the transmission format. As illustrated in FIG. 11A, the encoded data transmitted from the transmitting apparatus 101 to the receiving apparatus 102 is configured such that an encoding information header 211 and a transmission information header 212 are added to an original code stream 213.

As illustrated in FIG. 11B, the encoding information header 211 may be header information including an encoding-time buffer period 221 in which information regarding the encoding process performed by the encoding unit 112 is written.

The encoding information header 211 is generated by the format conversion unit 157 of the encoding unit 112, and is added to the code stream 213.

As illustrated in FIG. 11C, the transmission information header 212 may be header information including a transmission-time buffer period 222 in which information regarding a network status regarding a transmission path such as the network 103 is written.

The transmission information header 212 is generated by the transmission-time buffer period adding unit 204 of the format modifying unit 122, and is added to the code stream 213.

The encoding-time buffer period field of the encoding information header 211 contains the buffer period that is involved by smoothing the encoded data, which is generated by performing the encoding process on the image data, to the encoding rate and by outputting the encoded data and that is expected to be necessary for the receiving apparatus 102.

Further, the transmission-time buffer period field of the transmission information header 212 contains the buffer period that is involved by the transmission rate (which may be different from the encoding rate), network jitter, a retransmission delay in response to packet loss, and the like and that is expected to be necessary for the receiving apparatus 102.

As illustrated in FIGS. 11A to 11C, the above information is divided into different pieces of header information and is separately recorded (that is, the encoding-time buffer period and the transmission-time buffer period are added to the code stream 213 as different pieces of header information).

Thus, for example, even if encoded data to be transmitted is temporarily stored in a relay device or the like and is, thereafter, further sent to another device (if this process is repeated), the receiving apparatus 102 that last receives the encoded data and that reproduces the encoded data can set an appropriate buffer period in accordance with each delay period.

Transmission-Time Buffer Period

A transmission-time buffer period Bt_trans (sec) of the transmitting apparatus 101 is determined by the transmission unit 113. The transmission-time buffer period is adapted to determine an initial buffer delay necessary for synchronous reproduction when performed through the encoding process or the transmission process. In contrast with the encoding-time buffer period described above, the transmission-time buffer period may be determined by taking into account a buffer period necessary for synchronous reproduction in accordance with the status of the transmission path such as the network 103, called a network-responsive buffer period Bt_net (sec).

Figure 12:
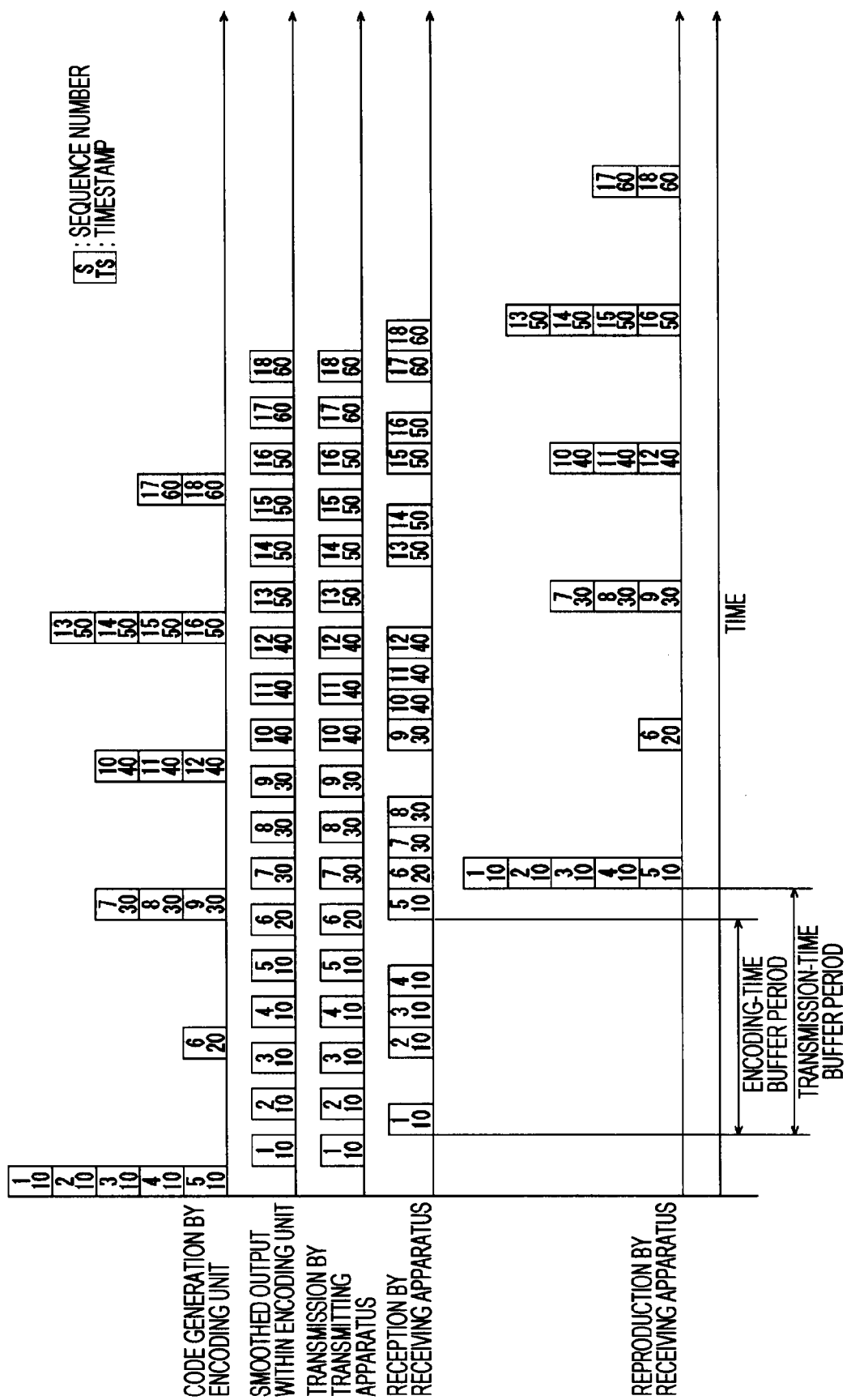
FIG. 12 is a diagram illustrating a transmission-time buffer period.

For example, as indicated in the third portion from the top of FIG. 12, even if the RTP transmitting unit 123 sends packets of encoded data at a predetermined constant sending rate (target transmission rate), the actual transmission rate may fluctuate depending on the status of the transmission path such as the network 103.

Therefore, as indicated in the fourth portion from the top of FIG. 12, the receiving rate of the encoded data when the receiving apparatus 102 receives the packets may fluctuate depending on the network status, and may become unstable.

Therefore, it is desirable that the initial buffer delay be set by taking into account not only the encoding-time buffer period but also the transmission-time buffer period caused by such a fluctuation in the network status.

When the encoding-time buffer period Bt_codec and the network-responsive buffer period Bt_net are independent from each other, the transmission-time buffer period Bt_trans can be determined according to Equation (6) as follows:

$$Bt\_trans = Bt\_codec + Bt\_net \quad (6)$$

When the network-responsive buffer period Bt_net has a value including the encoding-time buffer period Bt_codec, the transmission-time buffer period Bt_trans can be determined according to Equation (7) as follows:

$$Bt\_trans = max(Bt\_codec, Bt\_net) \quad (7)$$

For example, in view of the responsiveness to network jitter, the network-responsive buffer period Bt_net (sec) can be determined using a network-jitter-responsive buffer period Bt_jitter (sec) according to Equation (8) as follows:

$$Bt\_net = Bt\_jitter \quad (8)$$

The network-jitter-responsive buffer period Bt_jitter can be calculated using the timestamp value added to a packet and the variances of packets that arrive within a certain period of time with respect to the arrival time of the packet.

The maximum value or moving average value of the variances for a certain period of time may be set as the network-jitter-responsive buffer period Bt_jitter. The network jitter may use a jitter value included in, for example, an RTCP Receiver Report packet. In this case, the network-jitter-responsive buffer period Bt_jitter includes the encoding-time buffer period Bt_codec, and the transmission-time buffer period Bt_trans can therefore be calculated according to Equation (7) above.

The encoding-time buffer period Bt_codec and transmission-time buffer period Bt_trans determined in the above manner are added as, for example, as described above, stream information at the beginning of the stream in the transmission format and are transmitted.

Synchronization Control Unit

Next, the receiving apparatus 102 will be described. The encoded data received by the receiving apparatus 102 is analyzed by the format analysis unit 132, and the encoding-time buffer period 221 and the transmission-time buffer period 222 are extracted from the encoding information header 211 and the transmission information header 212, respectively. The extracted information is supplied to the synchronization control unit 133.

Figure 13:
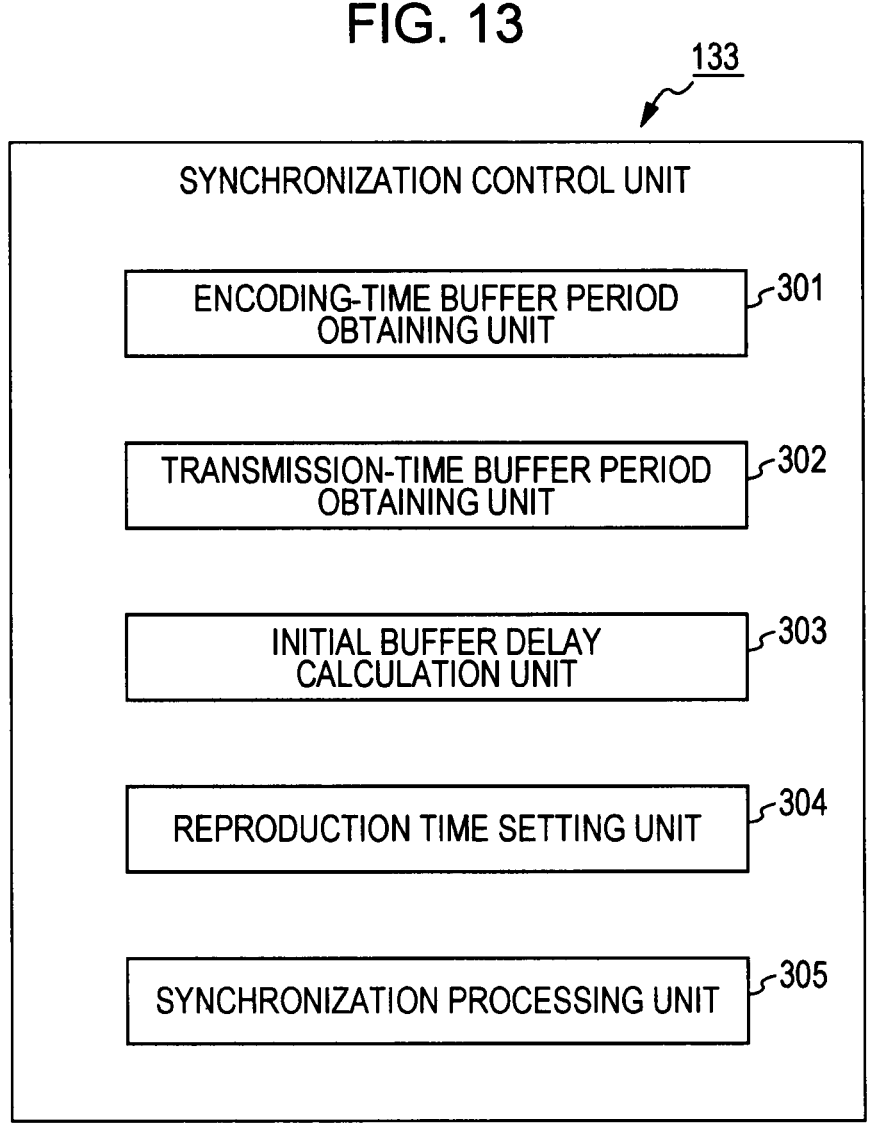
FIG. 13 is a block diagram illustrating a detailed example configuration of a format analysis unit.

FIG. 13 is a functional block diagram illustrating the functions of the synchronization control unit 133.

As illustrated in FIG. 13, the synchronization control unit 133 includes, as functional blocks, an encoding-time buffer period obtaining unit 301, a transmission-time buffer period obtaining unit 302, an initial buffer delay calculation unit 303, a reproduction time setting unit 304, and a synchronization processing unit 305.

The encoding-time buffer period obtaining unit 301 obtains the encoding-time buffer period extracted by the format analysis unit 132. The transmission-time buffer period obtaining unit 302 obtains the transmission-time buffer period extracted by the format analysis unit 132.

The initial buffer delay calculation unit 303 calculates an initial buffer delay necessary for synchronous reproduction in accordance with the encoding-time buffer period obtained by the encoding-time buffer period obtaining unit 301 and the transmission-time buffer period obtained by the transmission-time buffer period obtaining unit 302.

The reproduction time setting unit 304 sets a reproduction time that is the start time of the process for reproducing a decoded image obtained by decoding the encoded data in accordance with the initial buffer delay calculated by the initial buffer delay calculation unit 303.

The synchronization processing unit 305 controls the timing of reading the encoded data from the buffer 134, and performs synchronization control so that synchronous reproduction that is based on the reproduction time set by the reproduction time setting unit 304 can be performed.

The receiving apparatus 102 refers to the encoding-time buffer period Bt_codec and transmission-time buffer period Bt_trans written in the transmission format in the encoded data transmitted from the transmitting apparatus 101, and determines an initial buffer delay Bt_init necessary for synchronous reproduction.

The initial buffer delay Bt_init can be determined according to, for example, Equations (9) and (10) as follows:

$$Bt\_init = Bt\_codec \text{ (when Bt\_trans is an invalid value)} \quad (9)$$

$$Bt\_init = Bt\_trans \text{ (when Bt\_trans is a valid value)} \quad (10)$$

That is, if an invalid value is set in the transmission-time buffer period Bt_trans, as represented in Equation (9), the initial buffer delay calculation unit 303 sets the value of the encoding-time buffer period Bt_codec as the initial buffer delay Bt_init. If a valid value is set in the transmission-time buffer period Bt_trans, as represented in Equation (10), the initial buffer delay calculation unit 303 sets the value of the transmission-time buffer period Bt_trans as the initial buffer delay Bt_init.

The reproduction time setting unit 304 sets, for example, the first packet of the stream as a timing defining packet, and sets the time that is delayed by the time equal to the initial buffer delay Bt_init from the arrival time of this packet as the reproduction time corresponding to the timestamp value added to the first packet. The synchronization processing unit 305 uses the set reproduction time as a reference for the subsequent packets, and performs control so as to perform reproduction at the time synchronized with the added timestamp value.

By controlling synchronous reproduction in the manner as above, the transmitting/receiving system 100 (the transmitting apparatus 101 and the receiving apparatus 102) can perform low-delay transmission with a minimum delay in accordance with the network status without causing synchronization failure.

Decoding Unit

Figure 14:
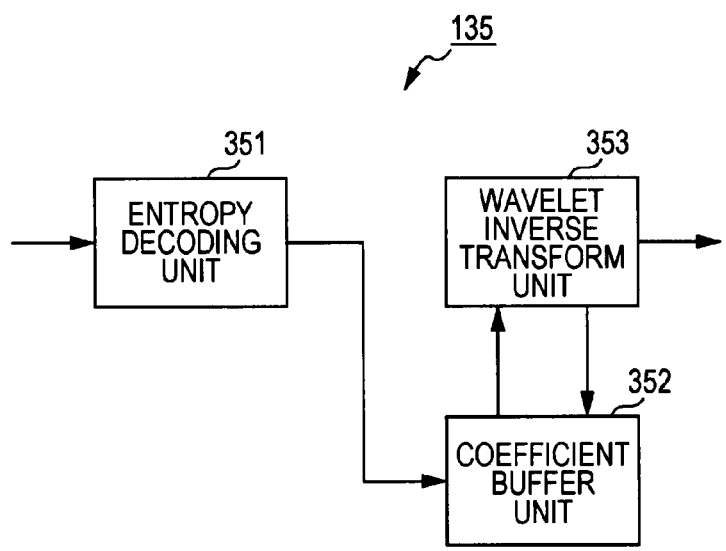
FIG. 14 is a block diagram illustrating a detailed example configuration of a decoding unit.

Next, the decoding unit 135 will be described. FIG. 14 is a block diagram illustrating an example configuration of the decoding unit 135.

As illustrated in FIG. 14, the decoding unit 135 may be a processing unit corresponding to the encoding unit 112, and may be configured to decode encoded data generated by the encoding unit 112 using the method corresponding to that in the encoding process of the encoding unit 112.

As illustrated in FIG. 14, the decoding unit 135 includes an entropy decoding unit 351, a coefficient buffer unit 352, and a wavelet inverse transform unit 353.

The entropy decoding unit 351 decodes the encoded data read from the buffer 134 under the control of the synchronization control unit 133 using the decoding method corresponding to the encoding method used by the entropy encoding unit 155, and obtains coefficient data. The coefficient data is supplied to and stored in the coefficient buffer unit 352.

The wavelet inverse transform unit 353 obtains the coefficient data stored in the coefficient buffer unit 352, and performs a composition filtering process based on a composition filter using the coefficient data. The wavelet inverse transform unit 353 supplies the result of the composition filtering process to the coefficient buffer unit 352 again to store it in the coefficient buffer unit 352.

The wavelet inverse transform unit 353 recursively iterates the above process to obtain decoded image data (output image data). Then, the wavelet inverse transform unit 353 outputs the obtained decoded image data to the outside.

Accordingly, the decoding unit 135 can decode encoded data with a low delay.

Process Flow

Next, the flow of the processes described above will be described.

First, an example of the flow of the transmitting process executed by the transmitting apparatus 101 will be described with reference to a flowchart of FIG. 15.

When the transmitting process is started, in step S101, the RTCP unit 124 of the transmitting apparatus 101 performs RTCP communication with the RTCP unit 136 of the receiving apparatus 102 via the network 103, and collects network status information.

In step S102, the capture unit 111 captures an input image, and obtains image data.

In step S103, the encoding unit 112 encodes the image data obtained in step S102. The details of the encoding process will be described below.

In step S104, the transmission smoothing unit 121 of the transmission unit 113 smoothes the bit rate of the encoded data in accordance with the transmission rate.

In step S105, the format modifying unit 122 determines whether or not the encoded data to be processed is the header portion at the beginning of the code stream. If it is determined that the encoded data is at the beginning of the code stream, the process proceeds to step S106.

In step S106, the format modifying unit 122 adds a transmission information header to the encoded data, and modifies the format. The details of the format modifying process will be described below. When the processing of step S106 is completed, the process proceeds to step S107. If it is determined in step S105 that the encoded data is not at the beginning of the code stream, the process proceeds to step S107.

In step S107, the RTP transmitting unit 123 converts the encoded data into an RTP packet, and sends the RTP packet to the network 103 so as to be addressed to the receiving apparatus 102.

In step S108, the transmitting apparatus 101 determines whether or not the transmitting process ends. For example, if all the portions of the input image have not been processed and it is determined that the transmitting process does not end, the process returns to step S102, and the subsequent processing is repeated.

If it is determined in step S108 that the transmitting process ends, the transmitting process ends.

Next, an example of the flow of the encoding process executed in step S103 of FIG. 15 will be described with reference to a flowchart of FIG. 16.

When the encoding process is started, in step S121, while the image line input unit 151 inputs a line, the wavelet transform unit 153 performs a wavelet transform using the line buffer unit 152.

In step S122, the wavelet transform unit 153 determines whether or not the transform process for one line block has been performed. If it is determined that the transform process for one line block has not been performed, the process returns to step S121, and the subsequent processing is repeated.

If it is determined in step S122 that the transform process for one line block has been performed, the process proceeds to step S123.

In step S123, the coefficient line rearrangement unit 154 changes the order of the coefficient data obtained by the wavelet transform from the order of wavelet transform processing to the order of wavelet inverse transform processing.

In step S124, the entropy encoding unit 155 performs entropy encoding. In step S125, the encoder built-in smoothing unit 156 performs smoothing in accordance with the encoding rate. In step S126, the encoder built-in smoothing unit 156 calculates an encoding-time buffer period in the manner described above.

In step S127, the format conversion unit 157 adds the encoding-time buffer period to the encoded data.

When the processing of step S127 is completed, the encoding process ends. Then, the process returns to step S103 of FIG. 15, and the processing after step S104 is repeated.

Figure 17:
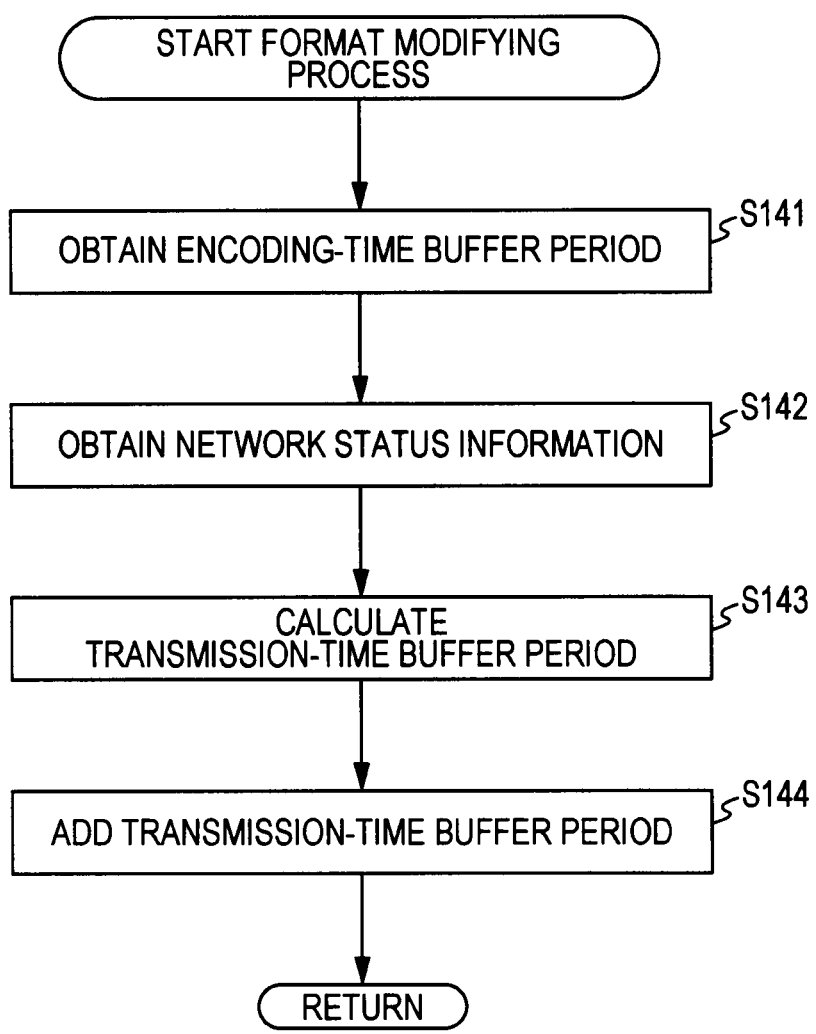
FIG. 17 is a flowchart illustrating an example of a flow of a format modifying process.

Next, an example of the flow of the format modifying process executed in step S106 of FIG. 15 will be described with reference to a flowchart of FIG. 17.

When the format modifying process is started, in step S141, the encoding-time buffer period obtaining unit 201 of the format modifying unit 122 refers to the encoding-time buffer period added to the encoded data, and obtains the encoding-time buffer period.

In step S142, the network status information obtaining unit 202 obtains the network status information collected by the RTCP unit 124.

In step S143, the transmission-time buffer period calculation unit 203 calculates a transmission-time buffer period in accordance with the encoding-time buffer period obtained in step S141 and the network status information obtained in step S142.

In step S144, the transmission-time buffer period adding unit 204 adds the transmission-time buffer period calculated in step S143 to the encoded data.

When the processing of step S144 is completed, the format modifying process ends. Then, the process returns to step S106 of FIG. 15, and the processing after step S107 is performed.

By executing the processes in the manner described above, the transmitting apparatus 101 can individually generate an encoding-time buffer period and a transmission-time buffer period, add the encoding-time buffer period and the transmission-time buffer period to the encoded data as different pieces of header information, and provide the receiving apparatus 102 with the resulting encoded data.

This allows the transmitting apparatus 101 to provide low-delay data transmission with reduced unnecessary delay periods in a more stable manner irrespective of the network status.

Next, an example of the flow of the receiving process executed by the receiving apparatus 102 will be described with reference to a flowchart of FIG. 18.

When the receiving process is started, in step S201, the RTCP unit 136 communicates with the RTCP unit 124 of the transmitting apparatus 101, and cooperates with the RTCP unit 124 that collects network status information. Alternatively, the RTCP unit 136 may collect network status information, if necessary.

In step S202, the RTP receiving unit 131 receives an RTP packet transmitted from the transmitting apparatus 101.

In step S203, the format analysis unit 132 determines whether or not encoded data extracted from the RTP packet includes a header. If it is determined that the encoded data includes a header, the process proceeds to step S204.

In step S204, the format analysis unit 132 extracts an encoding-time buffer period and a transmission-time buffer period from the encoded data. In step S205, the synchronization control unit 133 performs a synchronization control setting process. The details of the synchronization control setting process will be described below.

When the processing of step S205 is completed, the process proceeds to step S206. Further, if it is determined in step S203 that the encoded data does not include a header, the process proceeds to step S206.

In step S206, the buffer 134 holds the encoded data.

In step S207, the synchronization control unit 133 determines whether or not a synchronization control timing has reached. If it is determined that the synchronization control timing has not reached, the process returns to step S202, and the subsequent processing is repeated.

If it is determined in step S207 that the synchronization control timing has reached, the process proceeds to step S208.

In step S208, the synchronization control unit 133 controls the buffer 134 to read the encoded data in accordance with the synchronization control timing and to supply the encoded data to the decoding unit 135.

In step S209, the decoding unit 135 decodes the encoded data. The details of the decoding process will be described below.

In step S210, the decoding unit 135 outputs generated image data.

In step S211, the receiving apparatus 102 determines whether or not the receiving process ends. If any encoded data that has not been processed remains and it is determined that receiving process does not end, the process returns to step S202, and the processing after step S203 is repeated.

If it is determined in step S211 that the receiving process ends, the receiving process ends.

Next, an example of the flow of the synchronization control setting process executed by the synchronization control unit 133 in step S205 of FIG. 18 will be described with reference to a flowchart of FIG. 19.

When the synchronization control setting process is started, in step S231, the encoding-time buffer period obtaining unit 301 of the synchronization control unit 133 obtains the encoding-time buffer period extracted by the format analysis unit 132.

In step S232, the transmission-time buffer period obtaining unit 302 of the synchronization control unit 133 obtains the transmission-time buffer period extracted by the format analysis unit 132.

In step S233, the initial buffer delay calculation unit 303 of the synchronization control unit 133 calculates an initial buffer delay in accordance with the encoding-time buffer period obtained in step S231 and the transmission-time buffer period obtained in step S232.

In step S234, the reproduction time setting unit 304 of the synchronization control unit 133 determines a reproduction time in accordance with the initial buffer delay calculated in step S233, and sets the reproduction time.

Figure 18:
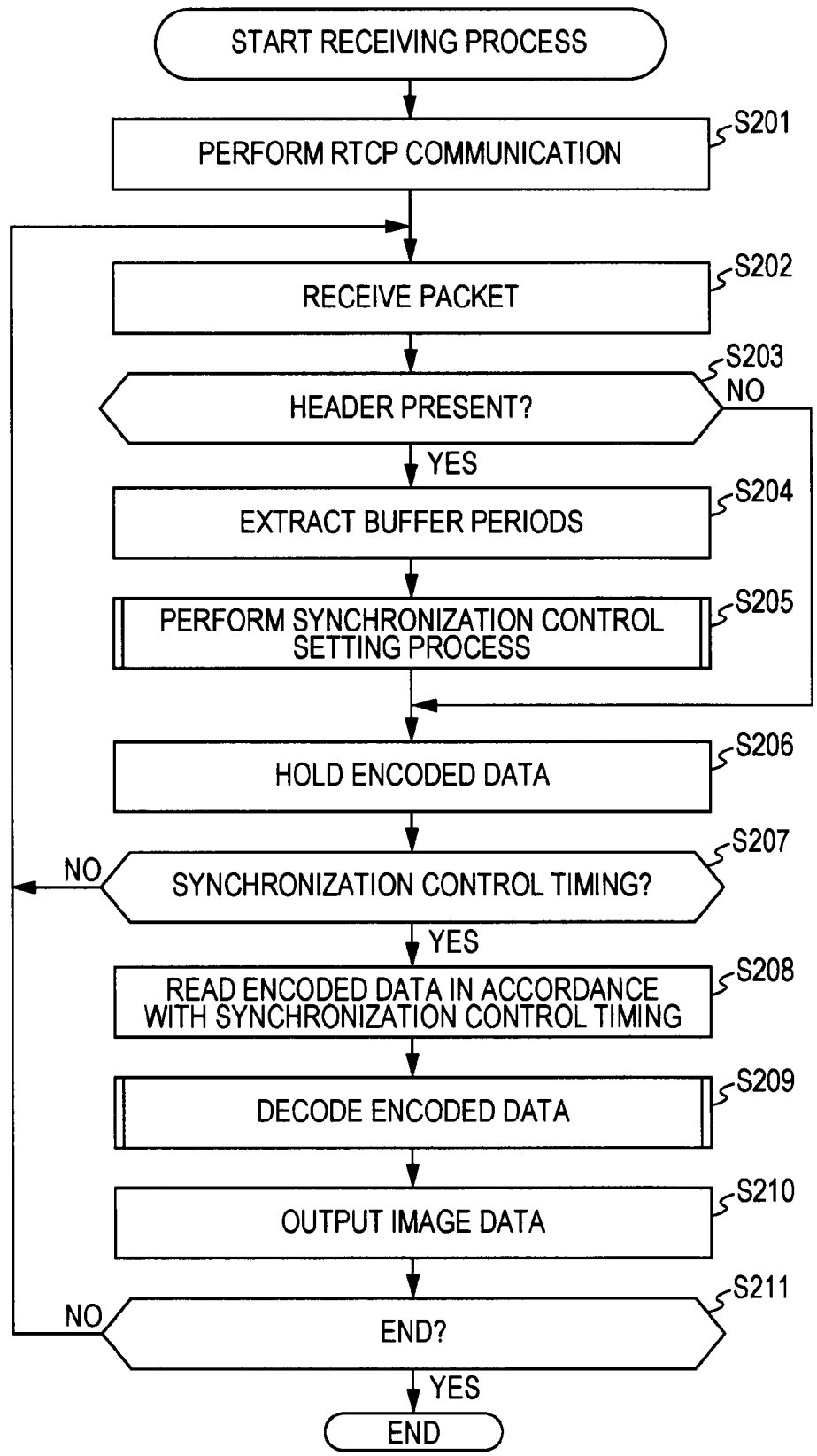
FIG. 18 is a flowchart illustrating an example of a flow of a receiving process.
Figure 19:
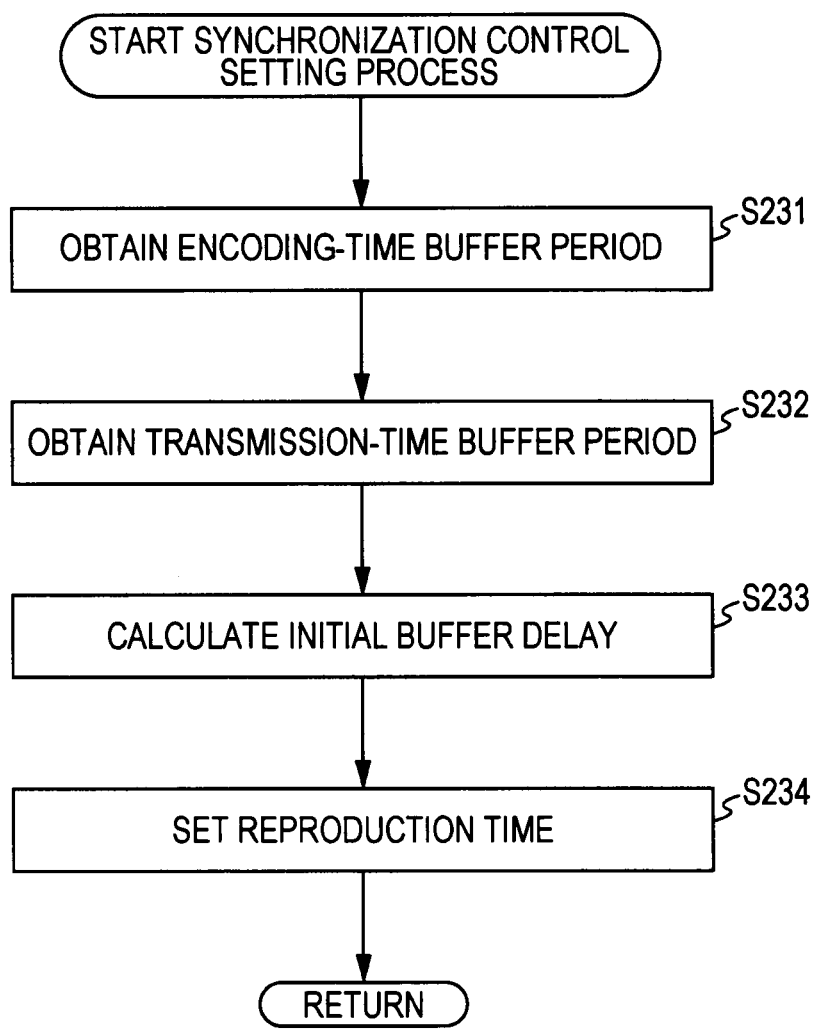
FIG. 19 is a flowchart illustrating an example of a flow of a synchronization control setting process.

When the processing of step S234 is completed, the process returns to step S205 of FIG. 18, and the processing after step S206 is executed.

Figure 20:
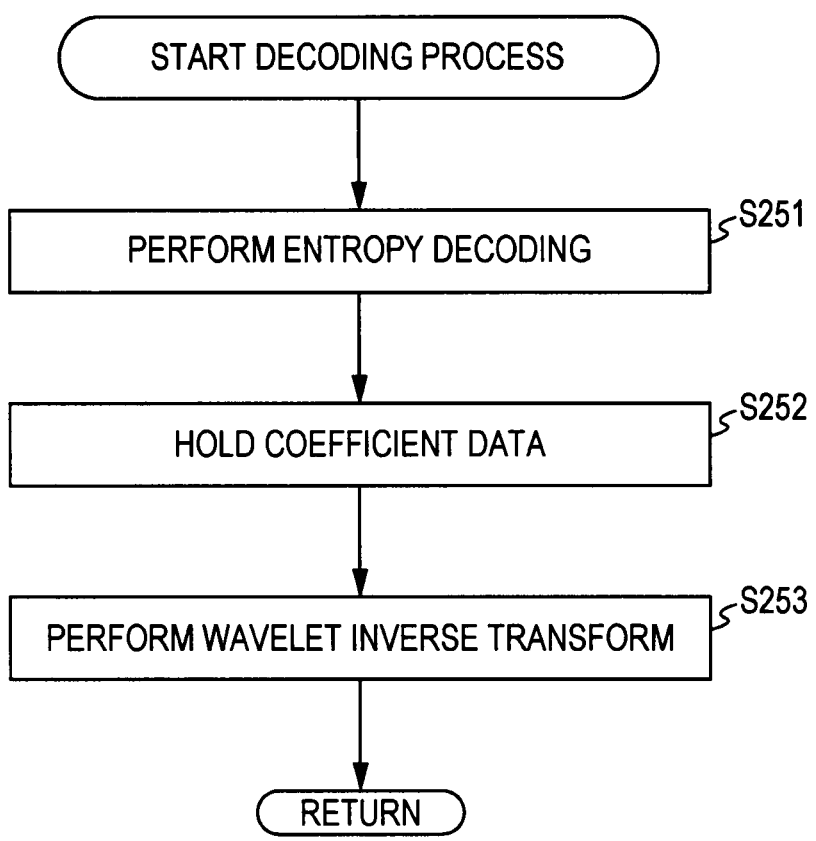
FIG. 20 is a flowchart illustrating an example of a flow of a decoding process.

Next, an example of the flow of the decoding process executed by the decoding unit 135 in step S209 of FIG. 18 will be described with reference to a flowchart of FIG. 20.

When the decoding process is started, in step S251, the entropy decoding unit 351 entropy-decodes the encoded data.

In step S252, the coefficient buffer unit 352 holds the coefficient data generated by entropy-decoding the encoded data in the processing of step S251.

In step S253, the wavelet inverse transform unit 353 appropriately reads the coefficient data from the coefficient buffer unit 352, and performs a wavelet inverse transform to generate image data.

When the image data is generated, the decoding process ends. Then, the process returns to step S209 of FIG. 18, and the subsequent processing is performed.

By executing the processes in the manner described above, the receiving apparatus 102 can obtain the encoding-time buffer period and transmission-time buffer period that are added to the encoded data as different pieces of header information, and can calculate an initial buffer delay in accordance with the obtained buffer periods.

This allows the receiving apparatus 102 to provide low-delay data transmission with reduced unnecessary delay periods in a more stable manner irrespective of the network status.

2. Second Embodiment

Device Configuration

In the first embodiment, as described above, in the transmitting apparatus 101, image data is encoded and is transmitted as encoded data. The encoding rate in the encoding process and the transmission rate in the transmission process may be different from each other.

Figure 21:
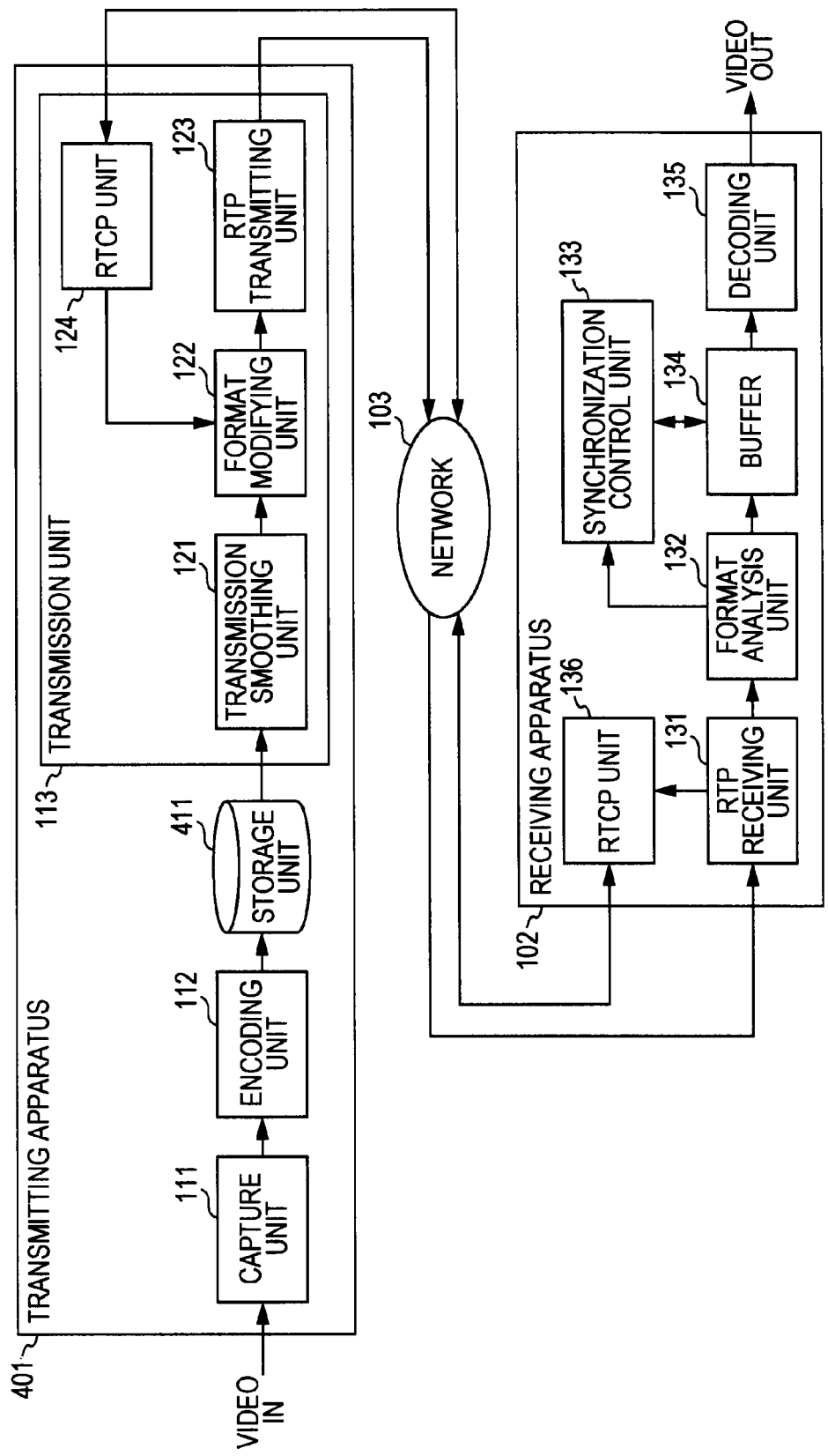
FIG. 21 is a block diagram illustrating an example configuration of a transmitting/receiving system according to a second embodiment of the present invention.

FIG. 21 is a block diagram illustrating an example configuration of a transmitting/receiving system 400 according to another embodiment of the present invention.

The transmitting/receiving system 400 illustrated in FIG. 21 may be a system basically similar to the transmitting/receiving system 100 illustrated in FIG. 1, and may have a similar configuration, except that a transmitting apparatus 401 is provided in place of the transmitting apparatus 101.

The transmitting apparatus 401 may be an apparatus basically similar to the transmitting apparatus 101 illustrated in FIG. 1, and may have a similar configuration. However, unlike the transmitting apparatus 101, the transmitting apparatus 401 further includes a storage unit 411 between the encoding unit 112 and the transmission unit 113. The other configuration is similar to the configuration of the transmitting apparatus 101.

The transmitting apparatus 401 is based on the assumption that the encoding rate in the encoding process performed by the encoding unit 112 and the transmission rate in the data transmission performed by the transmission unit 113 are different from each other.

The storage unit 411 may be a buffer for addressing the difference between the encoding rate and the transmission rate. The storage unit 411 sequentially stores the encoded data output from the encoding unit 112 at the timing (rate) corresponding to the encoding rate.

Further, the storage unit 411 sequentially reads the stored encoded data at the timing (rate) corresponding to the transmission rate.

Here, it is assumed that the network 103 is stable and that the initial buffer delay Bt_init of the receiving apparatus 102 is equal to an encoding-time buffer period Bt_codec specified at the time of encoding. In this case, for example, if the transmission rate is N (N>1) times the encoding rate, a network-responsive buffer period Bt_net can be determined using a rate-ratio-responsive buffer period Bt_rate according to Equations (11) and (12) as follows:

$$Bt\_rate = Bt\_codec/N \quad (11)$$

$$Bt\_net = Bt\_rate \quad (12)$$

In addition, the network-jitter-responsive buffer period Bt_jitter may also be reflected. In this case, the network-responsive buffer period Bt_net can be determined by adding the network-jitter-responsive buffer period Bt_jitter to the value produced by dividing the encoding-time buffer period Bt_codec by the ratio N of the transmission rate to the encoding rate.

Transmission-Time Buffer Period

Figure 22:
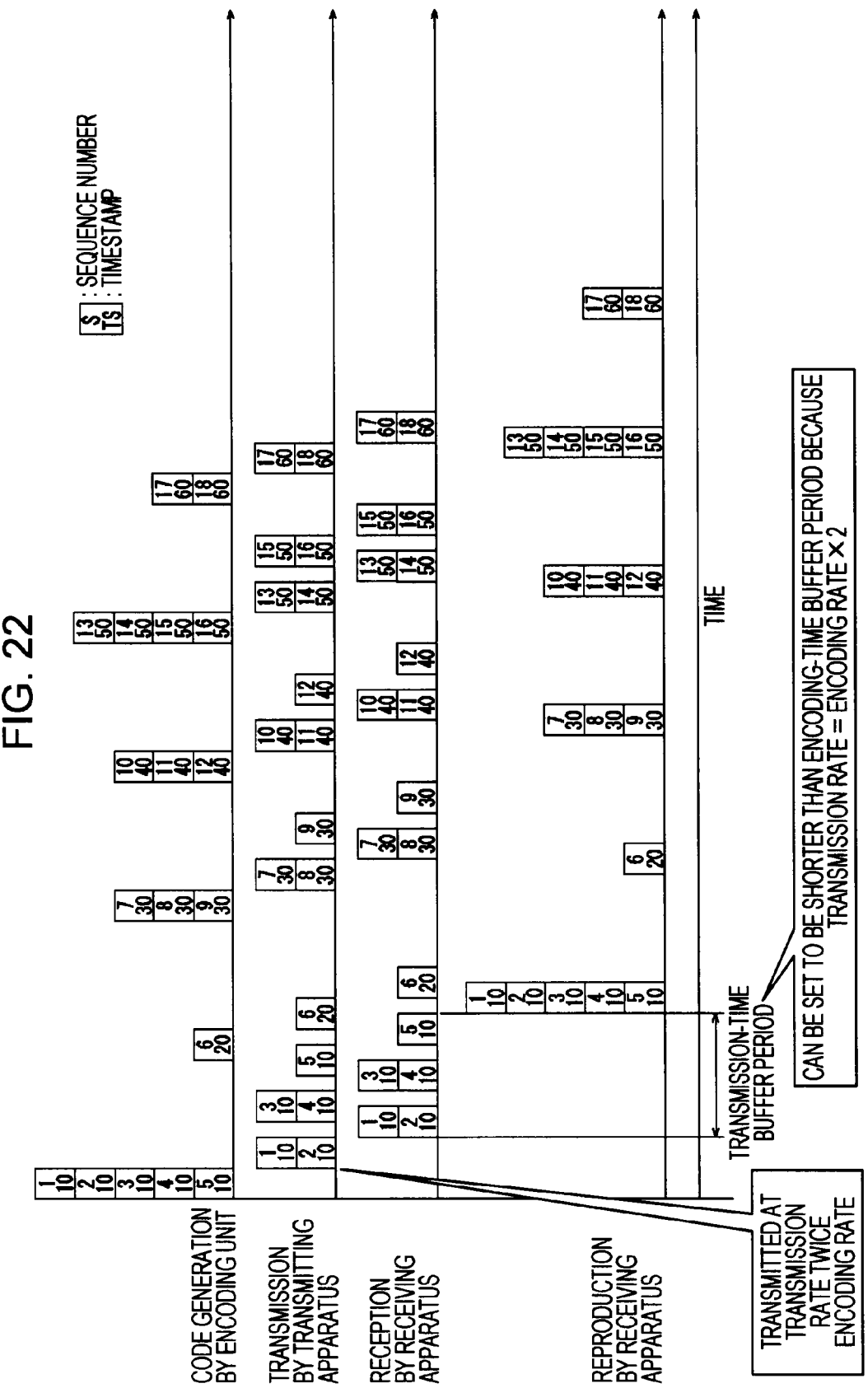
FIG. 22 is a diagram illustrating an example of a transmission-time buffer period according to the second embodiment.

In this case, the transmission-time buffer period is as illustrated in the bottom portion of FIG. 22. That is, as indicated in the second or third portion from the top of FIG. 22, if the transmission rate is N times (in the example of FIG. 22, twice) the encoding rate, then, the transmission-time buffer period can be 1/N times (in the example of FIG. 22, ½ times).

In this manner, by adjusting the transmission-time buffer period in accordance with the ratio of the transmission rate to the encoding rate, the transmitting apparatus 401 can provide low-delay data transmission with reduced unnecessary delay periods in a more stable manner irrespective of the network status.

Process Flow

Also in the transmitting/receiving system 400, the flow of the processes is basically similar to that in the transmitting/receiving system 100. However, the transmitting apparatus 401 temporarily holds the encoded data generated in the encoding process in the storage unit 411, and then performs data transmission. That is, the encoding process has been executed before the transmitting process is executed.

Figure 23:
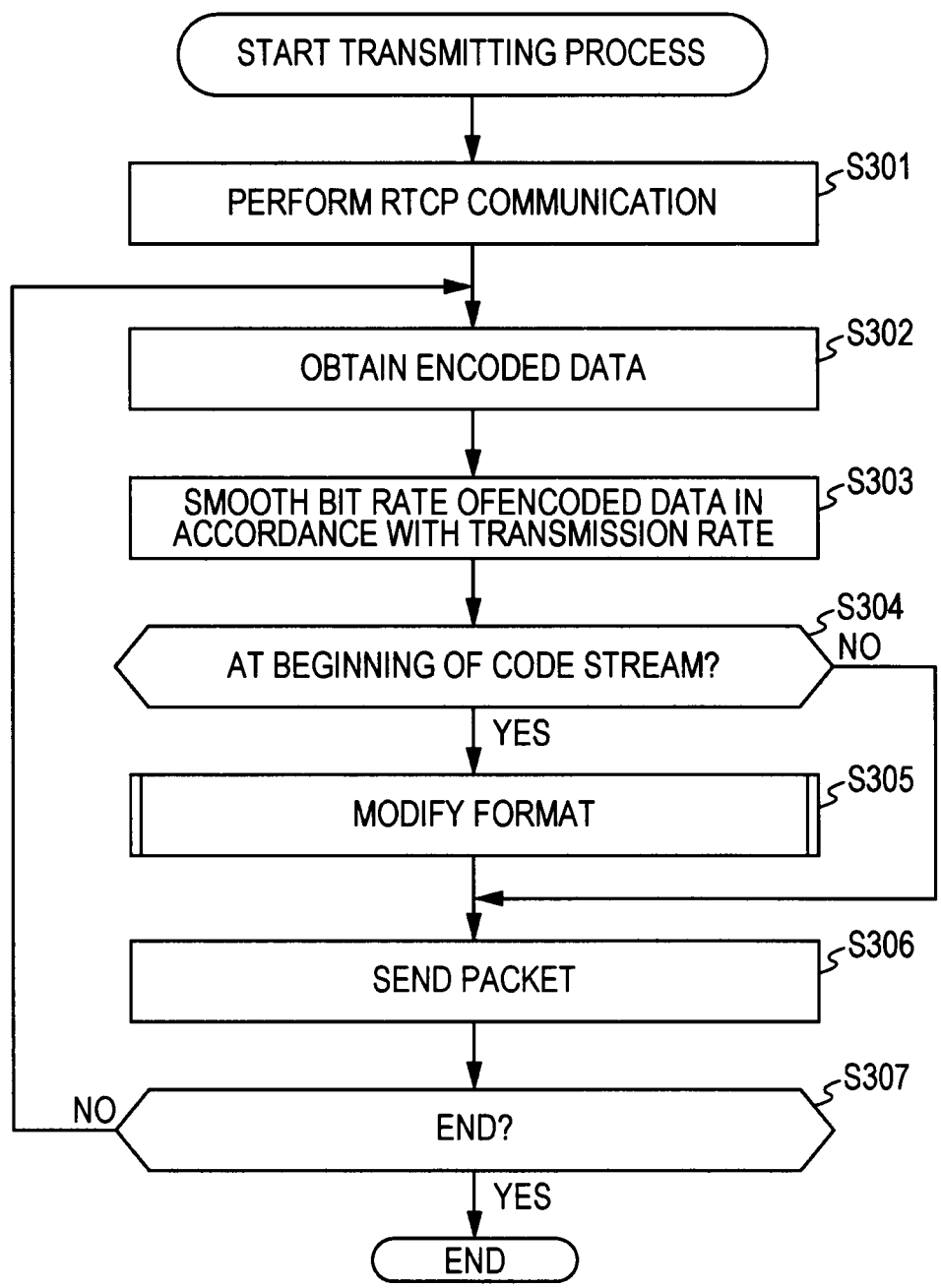
FIG. 23 is a flowchart illustrating an example of a flow of a transmitting process according to the second embodiment.

Therefore, the transmitting process in this case is performed in the flow described with reference to, for example, a flowchart of FIG. 23.

Figure 15:
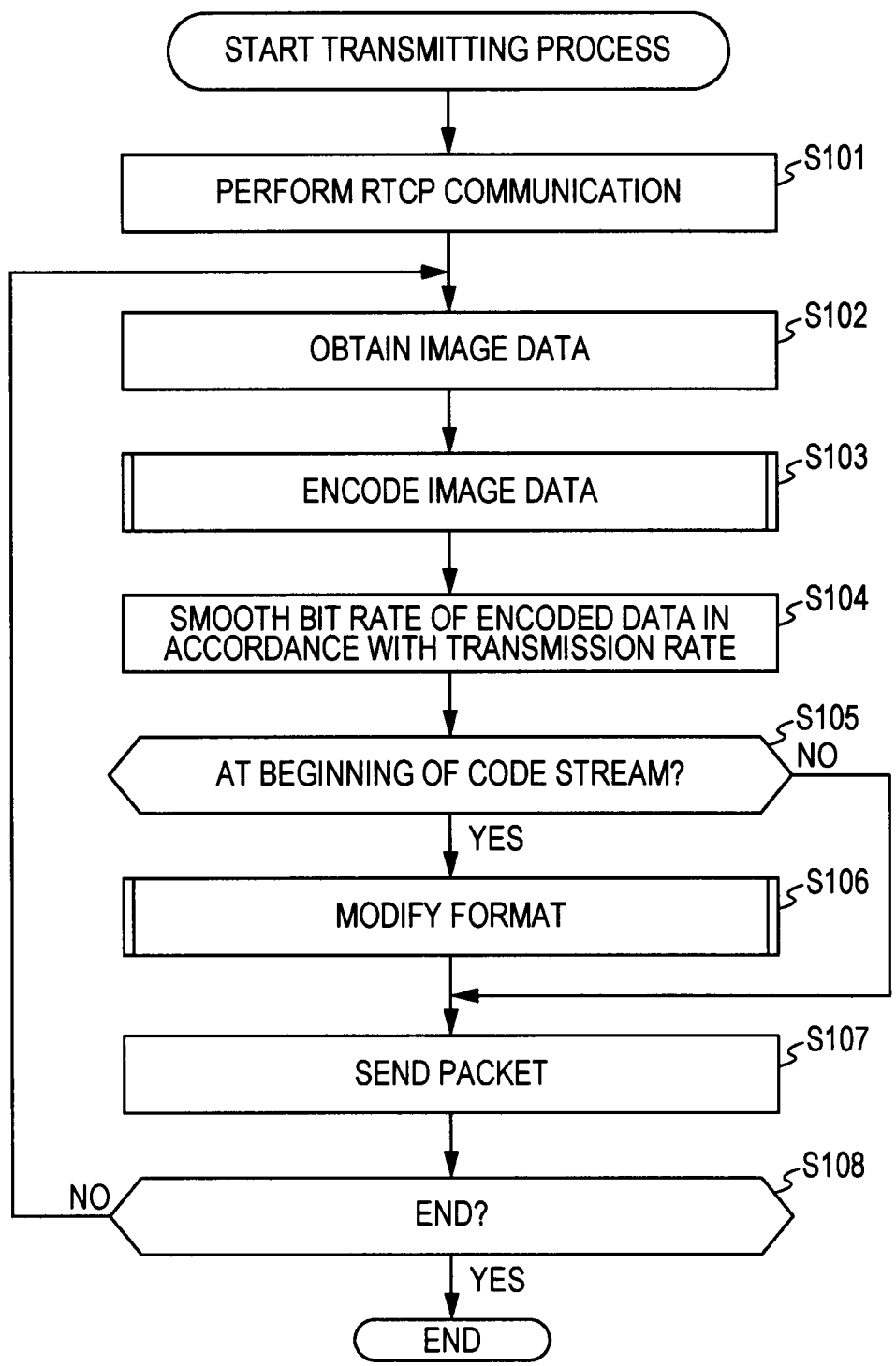
FIG. 15 is a flowchart illustrating an example of a flow of a transmitting process.
Figure 16:
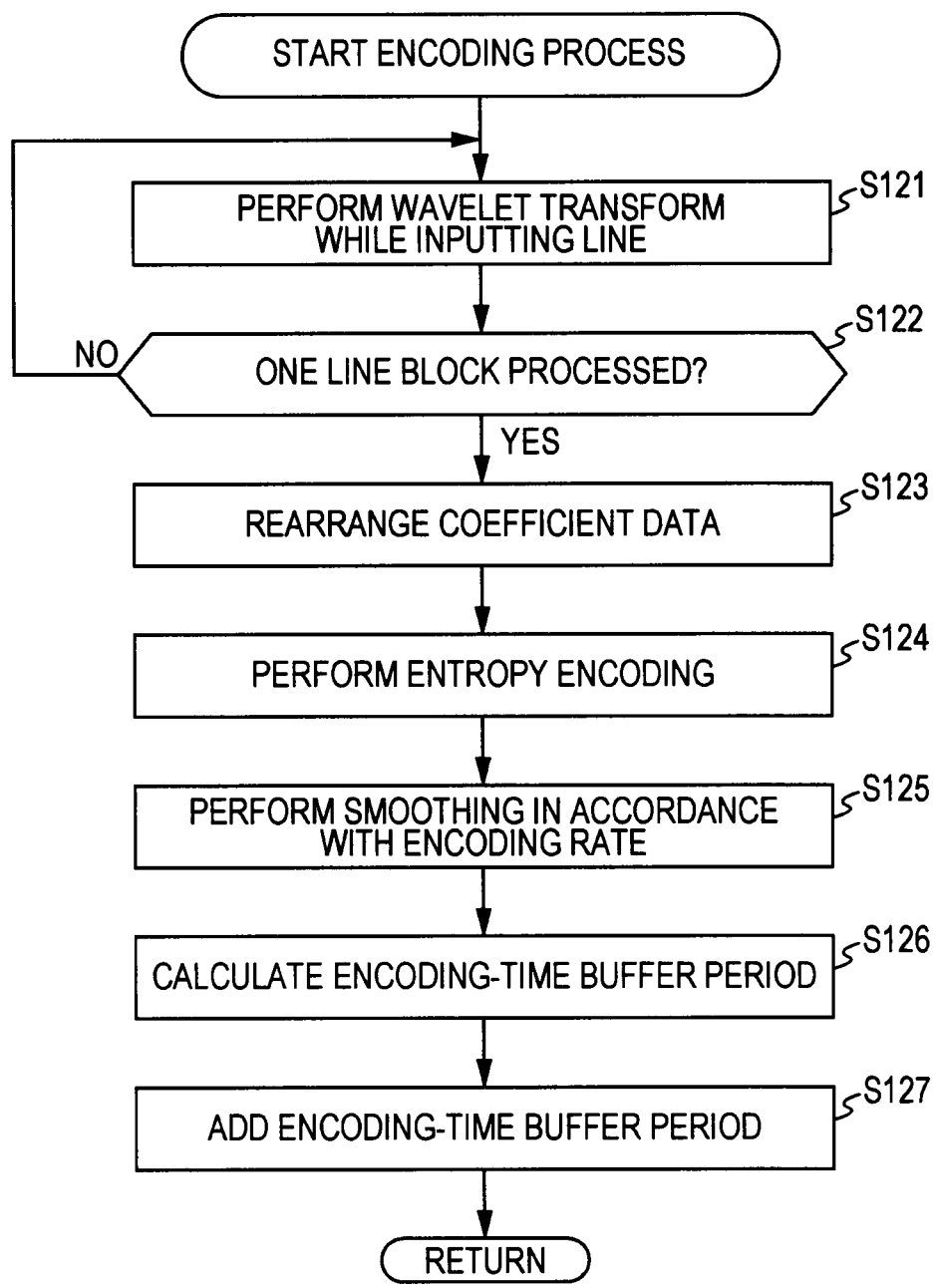
FIG. 16 is a flowchart illustrating an example of a flow of an encoding process.

That is, in place of the processing of step S102 for obtaining image data and the processing of step S103 for encoding the image data in the flowchart of FIG. 15, the processing of step S302 for obtaining encoded data from the storage unit 411 is performed.

The other processing is similar to that in FIG. 15.

By performing the process in the manner described above, the transmitting apparatus 401 and the receiving apparatus 102 can implement synchronous reproduction so that unnecessary delay periods are reduced without causing failure of synchronization even when the encoding rate and the transmission rate are different from each other.

3. Third Embodiment

Device Configuration

A transmitting apparatus may have a packet loss recovery function. For example, the Auto Repeat Request (ARQ) function may allow a receiving apparatus to request a transmitting apparatus to retransmit a lost packet using an RTCP packet.

Figure 24:
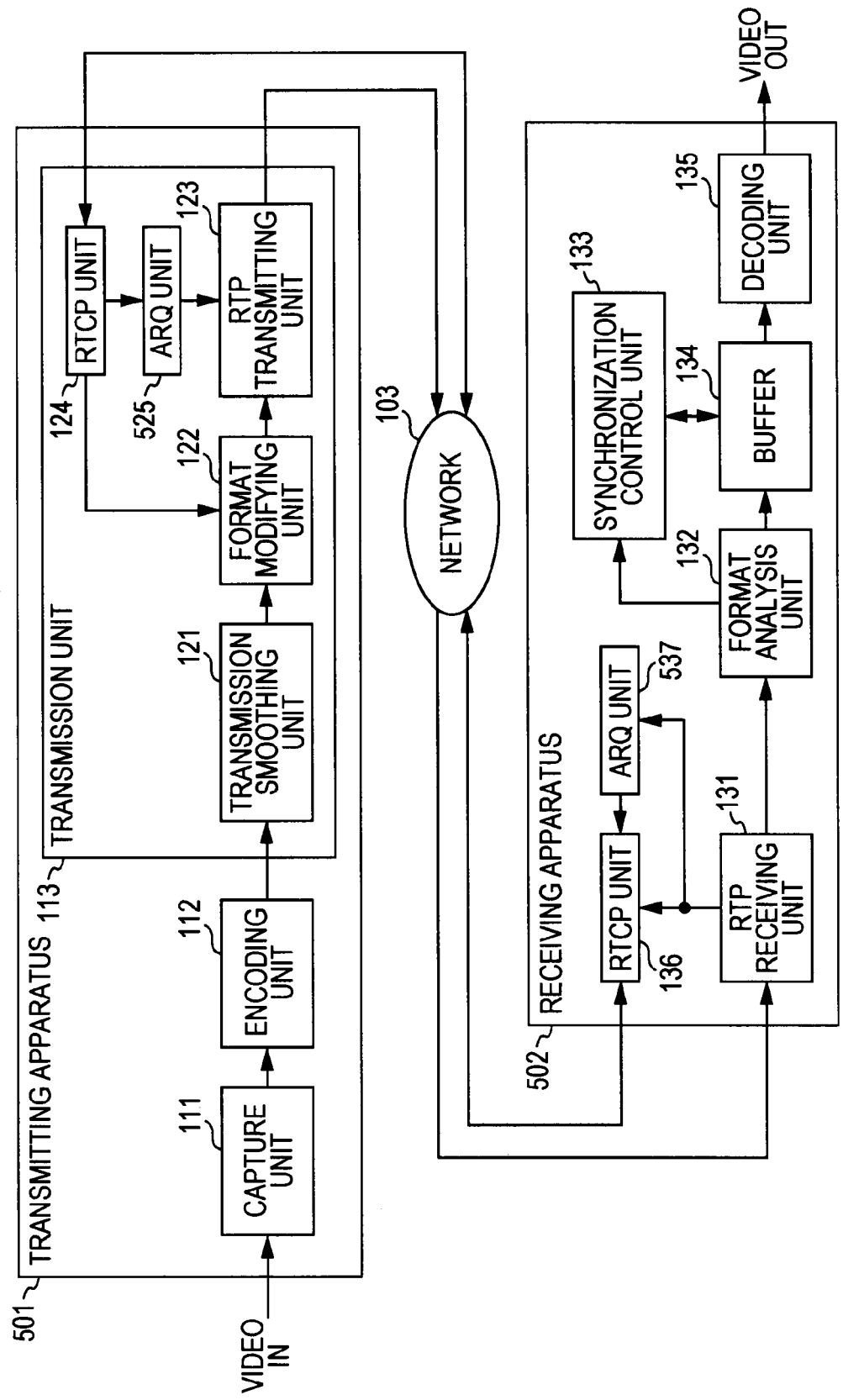
FIG. 24 is a flowchart illustrating an example of a transmitting/receiving system according to a third embodiment of the present invention.

FIG. 24 is a block diagram illustrating an example configuration of a transmitting/receiving system in this case. A transmitting/receiving system 500 illustrated in FIG. 24 may be a system basically similar to the transmitting/receiving system 100, except that the transmitting/receiving system 500 has the ARQ function, and may have a configuration basically similar to that of the transmitting/receiving system 100.

The transmitting/receiving system 500 includes a transmitting apparatus 501 and a receiving apparatus 502.

The transmitting apparatus 501 may be an apparatus basically similar to the transmitting apparatus 101 illustrated in FIG. 1, and may have a similar configuration. However, in addition to the configuration of the transmitting apparatus 101, the transmitting apparatus 501 further includes an ARQ unit 525.

The receiving apparatus 502 may be an apparatus basically similar to the receiving apparatus 102 illustrated in FIG. 1, and may have a similar configuration. However, in addition to the configuration of the receiving apparatus 102, the receiving apparatus 502 further includes an ARQ unit 537.

The ARQ unit 537 of the receiving apparatus 502 issues a retransmission request to the transmitting apparatus 501 using an RTCP packet when packet loss occurs.

Upon receipt of a retransmission request from the receiving apparatus 502 via the RTCP unit 124, the ARQ unit 525 of the transmitting apparatus 501 controls the RTP transmitting unit 123 to retransmit a requested packet.

In this system, it is desirable that an ARQ-responsive buffer period Bt_arq that is a buffer period for waiting for the arrival of a retransmitted packet be reflected in the initial buffer delay Bt_init. More specifically, for example, the network-responsive buffer period Bt_net may be determined according to Equation (13) as follows:

$$Bt\_net = Bt\_arq \qquad (13)$$

Furthermore, jitter, the ratio of the transmission rate to the encoding rate, and the like, as described in the first and second embodiments, may also be associated with the initial buffer delay Bt_init.

That is, when the network-jitter-responsive buffer period Bt_jitter, the rate-ratio-responsive buffer period Bt_rate, and the ARQ-responsive buffer period Bt_arq are provided, the network-responsive buffer period Bt_net can be determined using a combination thereof according to Equation (14).

$$Bt\_net = Bt\_jitter + Bt\_rate + Bt\_arq \qquad (14)$$

The network-responsive buffer period Bt_net can also be determined according to Equation (15) as follows:

$$Bt\_net = Bt\_rate + \max(Bt\_jitter, Bt\_arq) \qquad (15)$$

In addition, the network-responsive buffer period Bt_net can also be determined according to Equation (16) as follows:

$$Bt\_net = \max(Bt\_jitter, Bt\_rate, Bt\_arq) \qquad (16)$$

This allows the transmitting apparatus 501 and the receiving apparatus 502 to provide low-delay data transmission with reduced unnecessary delay periods in a more stable manner irrespective of the network status, in accordance with the status of the network 103 by using the jitter absorbing function, the packet loss recovery function, or any other suitable function.

It is to be understood that other network-responsive buffer periods besides those described above may also be reflected in an initial buffer delay.

In an embodiment of the present invention, in the case of transmission and synchronous reproduction of stream data of video or the like, an encoding-time buffer period and a transmission-time buffer period are written separately, and are transmitted together with an encoded version of the stream data. This ensures synchronous reproduction with a minimum buffer period (delay) that takes the network status into account while maintaining the independency of an encoding unit and an transmission unit.

In the encoding-time buffer period field, a buffer period that is expected to be necessary for the receiving apparatus 102 when an encoded data output is smoothed to the encoding rate and is output in the encoding process is written. In the transmission-time buffer period field, a buffer period that takes into account the transmission rate, network jitter, a retransmission delay in response to packet loss, and the like is written.

Furthermore, since the encoding-time buffer period and the transmission-time buffer period are recorded separately, even if the process of temporarily saving data obtained by the receiving apparatus 102 in a file and sending the data to another apparatus is repeated, the receiving apparatus that last receives the data can set an optimum buffer period.

In the foregoing description, an encoding-time buffer period and a transmission-time buffer period are calculated by a transmitting apparatus, and are supplied to a receiving apparatus. This is merely an example, and any other method may be used. For example, a transmitting apparatus may transmit information regarding encoding, network status information, and the like to a receiving apparatus. Then, the receiving apparatus may calculate an encoding-time buffer period and a transmission-time buffer period in accordance with the transmitted information, and further determine an initial buffer delay. In this case, the processes performed in the entire system are basically similar to those described above although the information transmitted between the apparatuses and the apparatuses that perform calculations are different.

4. Fourth Embodiment

Personal Computer

The series of processes described above can be executed by hardware or software. In this case, for example, a personal computer as illustrated in FIG. 25 may be provided.

In FIG. 25, a central processing unit (CPU) 601 of a personal computer 600 executes various processes in accordance with a program stored in a read only memory (ROM) 602 or a program loaded from a storage unit 613 into a random access memory (RAM) 603. The RAM 603 may also store data or the like necessary for the CPU 601 to execute various processes.

The CPU 601, the ROM 602, and the RAM 603 are connected to one another via a bus 604. An input/output interface 610 is also connected to the bus 604.

The input/output interface 610 is connected to an input unit 611 including a keyboard and a mouse, an output unit 612 including a display such as a cathode ray tube (CRT) display or a liquid crystal display (LCD) and speakers, the storage unit 613, which may be formed of a hard disk or the like, and a communication unit 614 which may be formed of a modem or the like. The communication unit 614 performs a communication process via a network including the Internet.

The input/output interface 610 is also connected to a drive 615, if necessary, to which a removable medium 621 such as a magnetic disk, an optical disk, a magneto-optical disk, or a semiconductor memory is appropriately attached. A computer program read from the removable medium 621 is installed into the storage unit 613, if necessary.

When the series of processes described above is executed by software, a program constituting the software is installed from a network or a recording medium.

The recording medium may be implemented using, for example, as illustrated in FIG. 25, the removable medium 621 on which the program is recorded, such as a magnetic disk (including a flexible disk), an optical disk (including a compact disc-read only memory (CD-ROM) and a digital versatile disc (DVD)), a magneto-optical disc (including a mini disc (MD)), or a semiconductor memory, which is distributed separately from the apparatus main body to deliver the program to a user, the ROM 602 or a hard disk included in the storage unit 613 on which the program is recorded, which is distributed to a user in the form incorporated in the apparatus main body, or any other suitable device.

The program executed by a computer may be a program according to which the processes are performed in a time-series manner in the order described herein, or may be a program according to which the processes are performed in parallel or performed at a necessary timing such as when called.

Furthermore, in this specification, the steps defining a program recorded on a recording medium may include, as well as processes performed in a time-series manner in the order described herein, processes executed in parallel or individually.

In this specification, the term "system" refers to an entire apparatus including a plurality of devices (apparatuses).

Furthermore, a configuration described above in the context of a single apparatus (or processing unit) may be divided into sections, and the sections may be configured as a plurality of apparatuses (or processing units). Conversely, configurations described above in the context of a plurality of apparatuses (or processing units) may be combined into a single apparatus (or processing unit). Moreover, the configuration of devices other than those described above may be added to the configuration of each apparatus (or each processing unit). In addition, a portion of the configuration of a certain apparatus (or processing unit) may be included in the configuration of another apparatus (or another processing unit) if substantially the same configuration or operation of the entire system can be achieved. That is, embodiments of the present invention are not limited to the embodiments described above, and a variety of modifications can be made without departing from the scope of the present invention.

The present application contains subject matter related to that disclosed in Japanese Priority Patent Application JP 2009-285039 filed in the Japan Patent Office on Dec. 16, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting apparatus comprising:
one or more processors operable to:
encode image data to generate encoded data;
add an encoding-time buffer period to the encoded data as encoding header information, the encoding-time buffer period being a minimum buffer period to prevent synchronous reproduction, in which the encoded data is decoded and reproduced in synchronization with a timestamp added to the encoded data, from failing due to a delay caused by the encoding of the image data;
add a transmission-time buffer period to the encoded data as transmission header information different from the encoding header information, the transmission-time buffer period being a minimum buffer period to prevent the synchronous reproduction from failing due to a delay caused by the encoding of the image data and transmission of the encoded data;
collect network status information, the network status information being status information regarding communication via the network, the network status information comprising at least a transmission rate, a network jitter, a packet loss rate, and a transmission delay;
calculate a network-responsive buffer period using the network status information, the network-responsive buffer period being a buffer period to prevent the synchronous reproduction from failing due to a delay caused by the transmission of the encoded data;
select a greater one of the encoding-time buffer period and the network-responsive buffer period;
calculate the transmission-time buffer period using one of the network-responsive buffer period and the encoding-time buffer period; and
transmit, via a network to another apparatus that performs the synchronous reproduction, the encoded data in which the encoding header information including the encoding-time buffer period and the transmission header information including the transmission-time buffer period have been added.

2. The transmitting apparatus according to claim 1, wherein the one or more processors are operable to set, as the transmission-time buffer period, a sum of the encoding-time buffer period and the network-responsive buffer period.

3. The transmitting apparatus according to claim 1, wherein the one or more processors are operable to set a network-jitter-responsive buffer period as the network-responsive buffer period, the network-jitter-responsive buffer period being a buffer period to prevent the synchronous reproduction from failing due to a delay caused by the network jitter of the network.

4. The transmitting apparatus according to claim 1, wherein the one or more processors are operable to calculate a rate-ratio-responsive buffer period, the rate-ratio-responsive buffer period being a buffer period to prevent the synchronous reproduction from failing due to a ratio of the transmission rate to an encoding rate at which the image data is encoded, wherein the one or more processors set, as the network-responsive buffer period, the calculated rate-ratio-responsive buffer period.

5. The transmitting apparatus according to claim 1, wherein the one or more processors are operable to set a retransmission-responsive buffer period as the network-responsive buffer period, the retransmission-responsive buffer period being a buffer period to prevent the synchronous reproduction from failing due to a delay caused by a retransmission process.

6. The transmitting apparatus according to claim 1, wherein the one or more processors are operable to set, as the network-responsive buffer period, a sum of a network-jitter-responsive buffer period, a rate-ratio-responsive buffer period, and a retransmission-responsive buffer period, the network-jitter-responsive buffer period being a buffer period to prevent the synchronous reproduction from failing due to a delay caused by the network jitter of the network, the rate-ratio-responsive buffer period being a buffer period to prevent the synchronous reproduction from failing due to a ratio of the transmission rate to an encoding rate at which the image data is encoded, the retransmission-responsive buffer period being a buffer period to prevent the synchronous reproduction from failing due to a delay caused by a retransmission process.

7. The transmitting apparatus according to claim 1, wherein the one or more processors are operable to set, as the network-responsive buffer period, a sum of a greater one of a network-jitter-responsive buffer period and a retransmission-responsive buffer period and a rate-ratio-responsive buffer period, the network-jitter-responsive buffer period being a buffer period to prevent the synchronous reproduction from failing due to a delay caused by the network jitter of the network, the retransmission-responsive buffer period being a buffer period to prevent the synchronous reproduction from failing due to a delay caused by a retransmission process, the rate-ratio-responsive buffer period being a buffer period to prevent the synchronous reproduction from failing due to a ratio of the transmission rate to an encoding rate at which the image data is encoded.

8. The transmitting apparatus according to claim 1, wherein the one or more processors are operable to set, as the network-responsive buffer period, a largest one of a network-jitter-responsive buffer period, a rate-ratio-responsive buffer period, and a retransmission-responsive buffer period, the network-jitter-responsive buffer period being a buffer period to prevent the synchronous reproduction from failing due to a delay caused by the network jitter of the network, the rate-ratio-responsive buffer period being a buffer period to prevent the synchronous reproduction from failing due to a ratio of the transmission rate to an encoding rate at which the image data is encoded, the retransmission-responsive buffer period being a buffer period to prevent the synchronous reproduction from failing due to a delay caused by a retransmission process.

9. The transmitting apparatus according to claim 1, wherein the one or more processors are operable to calculate the encoding-time buffer period, wherein the one or more processors add the calculated encoding-time buffer period to the encoded data as the encoding header information.

10. The transmitting apparatus according to claim 9, wherein the one or more processors are operable to set, as the encoding-time buffer period, a value produced by dividing an encoding rate at which the image data is encoded by a buffer size used to encode the image data.

11. A transmitting method comprising:
encoding image data to generate encoded data;
adding an encoding-time buffer period to the encoded data as encoding header information, the encoding-time buffer period being a buffer period to prevent synchronous reproduction from failing due to a delay caused by the encoding of the image data;
collect network status information, the network status information being status information regarding communication via the network, the network status information comprising at least a transmission rate, a network jitter, a packet loss rate, and a transmission delay;
calculate a network-responsive buffer period using the network status information, the network-responsive buffer period being a buffer period to prevent the synchronous reproduction from failing due to a delay caused by the transmission of the encoded data;
select a greater one of the encoding-time buffer period and the network-responsive buffer period;
calculate a transmission-time buffer period using one of the network-responsive buffer period and the encoding-time buffer period; and
adding the transmission-time buffer period to the encoded data as transmission header information different from the encoding header information, the transmission-time buffer period being a buffer period to prevent the synchronous reproduction from failing due to a delay caused by the encoding of the image data and transmission of the encoded data; and
transmitting via a network to another apparatus that performs the synchronous reproduction, the encoded data in which the encoding header information and the transmission header information have been added.

12. The transmitting method according to claim 11, wherein the synchronous reproduction comprises decoding and reproducing the encoded data in synchronization with a timestamp added to the encoded data.

13. A receiving apparatus comprising:
one or more processors operable to:
receive encoded data transmitted via a network, the encoded data being generated by encoding image data by another apparatus;
obtain an encoding-time buffer period by extracting the encoding-time buffer period from the received encoded data, the encoding-time buffer period being a buffer period to prevent synchronous reproduction from failing due to a delay caused by the encoding of the image data;
obtain network status information, the network status information being status information regarding communication via the network;
obtain a network-responsive buffer period using the network status information, the network-responsive buffer period being a buffer period to prevent the synchronous reproduction from failing due to a delay caused by the transmission of the encoded data;

obtain a transmission-time buffer period by extracting the transmission-time buffer period from the received encoded data, the transmission-time buffer period being a buffer period to prevent the synchronous reproduction of the encoded data from failing due to a delay caused by the encoding of the image data and transmission of the encoded data, wherein the transmission-time buffer period is calculated by selecting a greater one of the encoding-time buffer period and the network-responsive buffer period;

calculate an initial buffer delay using the encoding-time buffer period and the transmission-time buffer period, the initial buffer delay being an initial value of a buffer period to prevent the synchronous reproduction from failing;

store the received encoded data;

control the synchronous reproduction by controlling a read timing of the encoded data; and decode the encoded data in accordance with the control.

14. The receiving apparatus according to claim 13, wherein the one or more processors set the transmission-time buffer period as the initial buffer delay when the transmission-time buffer period added to the encoded data is valid, and sets the encoding-time buffer period added to the encoded data as the initial buffer delay when the transmission-time buffer period is invalid.

15. The receiving apparatus according to claim 13, wherein the synchronous reproduction comprises decoding and reproducing the encoded data in synchronization with a timestamp added to the encoded data.

16. A receiving method comprising:

receiving encoded data transmitted via a network, the encoded data being generated by encoding image data by another apparatus;

obtaining an encoding-time buffer period by extracting the encoding-time buffer period from the received encoded data, the encoding-time buffer period being a buffer period to prevent synchronous reproduction, in which the encoded data is decoded and reproduced in synchronization with a timestamp added to the encoded data, from failing due to a delay caused by the encoding of the image data;

obtaining network status information, the network status information being status information regarding communication via the network;

obtaining a network-responsive buffer period using the network status information, the network-responsive buffer period being a buffer period to prevent the synchronous reproduction from failing due to a delay caused by the transmission of the encoded data;

obtaining a transmission-time buffer period by extracting the transmission-time buffer period from the received encoded data, the transmission-time buffer period being a buffer period to prevent the synchronous reproduction of the encoded data from failing due to a delay caused by the encoding of the image data and transmission of the encoded data, wherein the transmission-time buffer period is calculated by selecting a greater one of the encoding-time buffer period and the network-responsive buffer period;

calculating an initial buffer delay using the obtained encoding-time buffer period and the obtained transmission-time buffer period, the initial buffer delay being an initial value of a buffer period to prevent the synchronous reproduction from failing;

storing the received encoded data;

controlling the synchronous reproduction by controlling a read timing of the stored encoded data; and decoding the encoded data in accordance with the control.

17. A transmitting apparatus comprising:

one or more processors operable to:

encode image data to generate encoded data;

add an encoding-time buffer period to the encoded data as encoding header information, the encoding-time buffer period being a buffer period to prevent synchronous reproduction, in which the encoded data is decoded and reproduced in synchronization with a timestamp added to the encoded data, from failing due to a delay caused by the encoding of the image data;

calculate a network-responsive buffer period using network status information regarding communication via a network, the network-responsive buffer period being a buffer period to prevent the synchronous reproduction from failing due to a delay caused by the transmission of the encoded data;

select a greater one of the encoding-time buffer period and the network-responsive buffer period;

add a transmission-time buffer period, calculated using one of the network-responsive buffer period and the encoding-time buffer period, to the encoded data as transmission header information different from the encoding header information, the transmission-time buffer period being a buffer period to prevent the synchronous reproduction from failing due to a delay caused by the encoding of the image data and transmission of the encoded data; and transmit, via a network to another apparatus that performs the synchronous reproduction, the encoded data in which the encoding header information and the transmission header information have been added.

18. A receiving apparatus comprising:

one or more processors operable to:

receive encoded data transmitted via a network, the encoded data being generated by encoding image data by another apparatus;

obtain an encoding-time buffer period by extracting the encoding-time buffer period from the encoded data, the encoding-time buffer period being a buffer period to prevent synchronous reproduction in which the encoded data is decoded and reproduced in synchronization with a timestamp added to the encoded data from failing due to a delay caused by the encoding of the image data;

obtain a network-responsive buffer period using network status information regarding communication via the network, the network-responsive buffer period being a buffer period to prevent the synchronous reproduction from failing due to a delay caused by the transmission of the encoded data;

obtain a transmission-time buffer period by extracting the transmission-time buffer period from the encoded data, the transmission-time buffer period being a buffer period to prevent the synchronous reproduction of the encoded data from failing due to a delay caused by the encoding of the image data and transmission of the encoded data, wherein the transmission-time buffer period is calculated by selecting a greater one of the encoding-time buffer period and the network-responsive buffer period;

calculate an initial buffer delay using the encoding-time buffer period and the transmission-time buffer period, the initial buffer delay being an initial value of a buffer period to prevent the synchronous reproduction from failing;
store the encoded data;
control the synchronous reproduction by controlling a read timing of the encoded data; and
decode the encoded data in accordance with the control.

* * * * *